United States Patent [19]
Tanase et al.

[11] Patent Number: 5,771,211
[45] Date of Patent: Jun. 23, 1998

[54] MAGNETO-OPTICAL RECORDING MEDIA HAVING A READING LAYER WITH A SPECIFIED RANGE OF TEMPERATURE COEFFICIENTS OF A KERR ROTATION ANGLE

[75] Inventors: Kenji Tanase, Gifu; Yoshihisa Suzuki, Bisai; Atsushi Yamaguchi, Oogaki, all of Japan

[73] Assignee: Sanyo Electric Co., Ltd., Osaka, Japan

[21] Appl. No.: 639,365

[22] Filed: Apr. 26, 1996

[30] Foreign Application Priority Data

| Apr. 26, 1995 | [JP] | Japan | 7-127095 |
| Aug. 31, 1995 | [JP] | Japan | 7-224387 |
| Nov. 22, 1995 | [JP] | Japan | 7-304345 |
| Nov. 24, 1995 | [JP] | Japan | 7-329915 |
| Nov. 30, 1995 | [JP] | Japan | 7-313148 |

[51] Int. Cl.$^6$ ................................................. G11B 11/00
[52] U.S. Cl. ........................................ 369/13; 478/694 ML
[58] Field of Search .............................. 369/13, 14, 275.2; 360/59, 114; 428/694 ML, 694 SC, 694 MT, 694 MM, 694 EC; 365/122

[56] References Cited

U.S. PATENT DOCUMENTS

| 5,278,810 | 1/1994 | Takahashi et al. | 369/13 |
| 5,486,395 | 1/1996 | Murakami et al. | 369/13 |
| 5,563,852 | 10/1996 | Murakami et al. | 369/13 |

FOREIGN PATENT DOCUMENTS

| 586175 | 3/1994 | European Pat. Off. . |
| 596716 | 5/1994 | European Pat. Off. . |
| 606498 | 7/1994 | European Pat. Off. . |
| 608134 | 7/1994 | European Pat. Off. . |
| 621592 | 10/1994 | European Pat. Off. . |
| 657880 | 6/1995 | European Pat. Off. . |
| 668586 | 8/1995 | European Pat. Off. . |
| 5255393 | 4/1995 | Japan . |
| 7201089 | 8/1995 | Japan . |
| 8147779 | 6/1996 | Japan . |

*Primary Examiner*—Tan Dinh
*Attorney, Agent, or Firm*—Loeb & Loeb LLP

[57] ABSTRACT

The magneto-optical recording medium, including a transparent polycarbonate substrate, an interference layer made of SiN, a reading layer made of GdFeCo, a recording layer made of TbFeCo, an oxidation-preventing layer made of SiN, a irradiation layer made of Al and an ultraviolet-setting plastic layer, is disclosed. Each layer is deposited to a suitable thickness in the above-named order on the transparent polycarbonate substrate. The composition of each element in the reading layer and the recording layer is set to a suitable value to achieve acceptable characteristics. A high recording and reading density is achieved.

167 Claims, 49 Drawing Sheets

(a) Conventional
(b) Pulse Modulating
(c) Pulse Modulating and Heat Radiation Layer

Fig.27

| | Molding Temperature (°C) | Mold Clamping Force (Kg/cm²) | Resin Injection Velocity (mm/sec) | Heating Cylinder Temperature (°C) | Cooling Time (sec) |
|---|---|---|---|---|---|
| Example 15 | 120 | 200 | 180 | 320 | 13 |
| Example 16 | 125 | 180 | 180 | 340 | 12 |
| Example 17 | 120 | 220 | 150 | 340 | 9 |
| Example 18 | 118 | 200 | 200 | 310 | 10 |

Fig.28

| | Track Pitch (μm) | Depth of Groove (nm) | Radius of Curvature (nm) | Double Refraction (nm) | Variation of Double Refraction (nm) |
|---|---|---|---|---|---|
| Example 15 | 1.4 | 68 | 35 | 22 | 8 |
| Example 16 | 1.2 | 68 | 35 | 20 | 6 |
| Example 17 | 1.0 | 67 | 40 | 24 | 10 |
| Example 18 | 0.8 | 65 | 50 | 25 | 8 |

Fig.29

Forming Condition of Heat Radiation Layer (A1)

| Forming Method | RF Magnetron Sputtering |
|---|---|
| RF Power | 100 - 1000 [W] |
| Ar Gas Pressure | 1 - 10 [mTorr] |
| Film Thickness | 0 - 100 [nm] |

Fig.30

Forming Condition of Recording Layer (TbFeCo)

| Forming Method | RF Magnetron Sputtering |
|---|---|
| Target | TbFeCo Alloy |
| RF Power | 50 – 900 (W) |
| Ar Gas Pressure | 2 – 10 (mTorr) |

Fig.31

Forming Condition of Reading Layer (GdFeCo)

| Forming Method | RF 2-Elements Magnetron Sputtering |
|---|---|
| Target | Gd/FeCo Alloy |
| RF Power | 50 - 900 [W] (Gd:70[W], FeCo:200[W]) |
| Ar Gas Pressure | 2 - 10 [mTorr] |

Fig.32

| Recording Condition | |
|---|---|
| Laser Wavelength | 680 (nm) |
| Numerical Aperture | 0.55 |
| Recording Linear Velocity | 2.0 (m/sec) |
| Recording Frequency | 2.0 (MHz) |
| External Magnetic Field | ±50 – 500 (Oe) |
| Recording Power | 3 – 9 (mW) |
| Duty of Laser Pulse | 20 – 60 (%) |

Fig.33

| Reading Condition | |
|---|---|
| Laser Wavelength | 680 [nm] |
| Numerical Aperture | 0.55 |
| Resding Linear Velocity | 2.0 [m/sec] |
| Reading Power | 0.3 - 3 [mW] |

Fig.34

| Forming Condition of SiN | |
|---|---|
| Forming Method | RF Magnetron Sputtering |
| RF Power | 50 – 800 [W] |
| Ar Gas Pressure | 1 – 10 [mTorr] |
| Film Thickness | 60 – 90 [nm] |

Fig.35

| Thickness of Al Layer [nm] | 0 | 20 | 30 | 50 | 100 |
|---|---|---|---|---|---|
| Reading Resolution (*) | 0.47 | 0.7 | 0.72 | 0.72 | 0.73 |

* 0.5 μm domain length / 2.0 μm domain length

Fig.49

| Materials | Target | Ar Gas Pressure (Pa) | Power (W) |
|---|---|---|---|
| $Gd_{30}Fe_{55}Co_{15}$ | Fe+Gd, Co chip | 0.27 – 2.7 | 100 – 500 |
| $(Mn_{100-x}Cr_x)_2Sb$ | Mn+Cr, Sb chip | 0.27 – 2.7 | 50 – 500 |
| $Si_3N_4$ | $Si_3N_4$ | 0.14 – 1.4 | 300 |

MAGNETO-OPTICAL RECORDING MEDIA HAVING A READING LAYER WITH A SPECIFIED RANGE OF TEMPERATURE COEFFICIENTS OF A KERR ROTATION ANGLE

BACKGROUND OF THE INVENTION

1. Field of the Invention

The present invention generally relates to magneto-optical recording media and recording and reading methods for such media. More particularly, the present invention relates to a magneto-optical recording medium having an exchange-coupled magnetic layer including a recording layer, which is a perpendicular magnetization film, and a reading layer, which is an in-plane magnetization film at about room temperature, and has achieved a high recording density by being so arranged that the direction of magnetization of the recording layer is copied into the reading layer when a recorded signal is read from the medium.

2. Description of the Related Art

The magneto-optical recording medium has drawn attention as a recording medium which is rewritable, large in storage capacity and high in reliability. For this reason, this medium is used as a computer storage medium, for example. However, due to the increase in information volume and the downsizing of related hardware, it is desirable for this medium to have a higher recording and reading density.

High density recording and reading technology consists of technology on the hardware side and technology on the medium side. The hardware side includes a technique for utilizing optical super-resolution phenomena to stop down the spot diameter of the laser beam to below the diffraction limits of the laser beam and a technique for manufacturing the laser diode which outputs a laser beam of shorter wavelength. The medium side includes a technique for forming tracks of narrow pitch on the recording medium and a technique for improving the resolution of reading by utilizing a magnetic multilayer film.

The technique for improving the resolution of reading by utilizing a magnetic multilayer film is based on the fact that the temperature distribution of a laser spot is the most concentrated at and around the center of the laser spot, constituting a Gaussian distribution. By utilizing this fact, the state of the recording layer at and around the center of the laser spot is copied into the reading layer, and then the state of the reading layer is read.

In the magneto-optical recording medium utilized in conventional optical super-resolution techniques, generally a recording layer which is a perpendicular magnetization film is utilized. As a substrate for the conventional magneto-optical recording medium, generally a glass substrate is used.

The recording of a signal into the magneto-optical recording medium having a recording layer and a reading layer is achieved by raising the temperature of a target domain of the reading layer to the Curie temperature thereof or higher by focusing a laser beam spot onto the domain, then lowering the temperature of that domain, and aligning the direction of magnetization of that domain with the direction of the applied external magnetic field, and then further lowering the temperature of that domain to copy the direction of magnetization of that domain into an corresponding domain of the recording layer. This means that the recording is performed by a thermal magnetic method, and therefore the magnetic-temperature characteristics and composition of each layer have an effect on the recording characteristics. At about room temperature, the magnetization of the reading layer has an in-plane direction.

In order to raise the temperature of the target domain of the reading layer to the Curie temperature or higher, the laser power needs to be increased. If the heating is insufficient, the carrier-to-noise ratio (CNR) of the recording signal degrades. On the other hand, in order to align the direction of magnetization of the reading layer whose heating is insufficient with the direction of the external magnetic field, a strong magnetic field needs to be applied. However, even if a strong magnetic field is applied, it is impossible to prevent the degradation in the CNR of the recording signal. Furthermore, in the magnetic modulation-type recording, a small magnetic field should preferably be applied.

If the Curie temperature of the recording layer is so low that there is a large difference between the Curie temperature of the reading layer and the Curie temperature of the recording layer, in the temperature lowering process of the recording, when the temperature becomes lower than the Curie temperature of the recording layer and the direction of the magnetization of the reading layer begins to be copied to the recording layer, a part of magnetization of the reading layer has already begun to take the in-plane direction. This causes the noise of the signal to be copied from the reading layer into the recording layer, and therefore this creates a problem in that the CNR of the recording signal decreases.

The reproduction of the information from the magneto-optical recording medium having a recording layer and a reading layer is based on the fact that the temperature distribution of a laser spot is the most concentrated at and around the center of the laser spot, constituting a Gaussian distribution. By utilizing this fact, the state of the recording layer at the center of the laser spot is copied into the reading layer, and the state of the reading later is read. In such reading method, the temperature distribution of the reading layer whose temperature is raised by the laser spot should be in a desired distribution. This is because if such temperature distribution fails to be the desired distribution, noise caused by disordered directions of magnetization or crosstalk noise, caused by excessive reading from the circumferential low temperature area of the center of the laser spot, increases.

In a magneto-optical recording medium of laser passing-type in which the laser beam passes through the magnetic layer, the heat accumulation caused by the laser beam is negligible. However, in a magneto-optical recording medium of laser reflecting type in which the laser beam is reflected by the magnetic layer, the thickness of the magnetic layer is 400 Å or more, for example, and the accumulated heat has an effect on the temperature distribution of the reading layer. Therefore, this creates a problem in that such noise as described above increases.

Furthermore, as recording in the conventional magneto-optical recording medium is made by irradiating a laser beam of a certain intensity, the temperature rise area of the recording layer is larger than the diameter of the laser spot. As a result, this creates a problem in that the recording spot is so large that increasing the density is difficult.

In addition, when a glass substrate is used as a substrate, there are other problems in that the weight of the magneto-optical recording medium is relatively heavy, the magneto-optical recording medium may be damaged when it is dropped, the magneto-optical recording medium is not suitable to a high-speed revolution, the necessity of surface polishing raises the manufacturing cost, and a guide groove for use in tracking a laser beam cannot easily be directly formed direct, to name a few.

Moreover, according to conventional methods, such as the conventional CAD method, the change from an in-plane magnetization film into a perpendicular magnetization film within the reading layer occurs within a wide range of temperatures from about several tens of degrees centigrade (°C.) to near about 100° C., and the magnetization of the recording layer affects the reading layer so as to disturb the in-plane magnetization of the reading layer, and the mask effect is degraded. Therefore, the copying area is not clear, reading noise is large, and the magnetic super-resolution or MSR effect cannot be achieved as much. Furthermore, as there is no clear threshold value for copying, the copying temperature is likely to depend on the material manufacturing conditions. Therefore, uniform characteristics cannot be obtained.

SUMMARY OF THE INVENTION

It is an object of the present invention for a magneto-optical recording medium of such type that detects reflected laser beam from the magnetic layer to reduce the noise described above by making the heat accumulation negligible.

It is another object of the present invention to provide a magneto-optical recording medium which can record even if the application magnetic field is small and can suitably be used for the magnetic field modulation mode.

It is still another object of the present invention to provide a magneto-optical recording medium which can record with an acceptable carrier-to-noise ratio or CNR.

It is also an object of the present invention to provide a magneto-optical recording medium which can achieve high-density recording and reading by limiting the area which is heated to a certain temperature in recording and reading.

It is also an object of the present invention to provide a magneto-optical recording medium which can simply and easily be handled.

It is also an object of the present invention to provide a magneto-optical recording medium which has a clear copying temperature, a low reading noise, a large MSR effect and a high uniformity by providing the magnetic copying function not to the reading layer but to the recording layer itself.

These objects can be achieved by forming a magneto-optical recording medium according to the present invention to comprise a transparent substrate 41, an interference layer 42, a reading layer 43, a recording layer 44, a protection layer 45, a radiation layer 46 and an ultraviolet-setting plastic layer 47, as shown in FIG. 17, and designing each of these layers to have improved characteristics.

BRIEF DESCRIPTION OF THE DRAWINGS

FIG. 27 shows the injection molding conditions of the transparent polycarbonate substrate of the magneto-optical recording media according to a preferred embodiment of the present invention;

FIG. 28 shows the characteristics of the transparent polycarbonate substrate of the magneto-optical recording medium according to a preferred embodiment of the present invention;

FIG. 29 shows the formation conditions of an Al film according to a preferred embodiment of the present invention;

FIG. 30 shows the formation conditions of a recording layer according to a preferred embodiment of the present invention;

FIG. 31 shows the formation conditions of a reading layer according to a preferred embodiment of the present invention;

FIG. 32 shows the recording conditions for recording onto the magneto-optical recording medium according to a preferred embodiment of the present invention;

FIG. 33 shows the reading conditions for reading from the magneto-optical recording medium according to a preferred embodiment of the present invention;

FIG. 34 shows the formation conditions of the SiN film according to a preferred embodiment of the present invention;

FIG. 35 shows the relations between Al film thickness and the reading resolution of examples according to a preferred embodiment of the present invention;

FIG. 49 shows the film formation conditions of the recording layer, reading layer and on layer according to the ninteenth example.

DETAILED DESCRIPTION OF THE PREFERRED EMBODIMENTS (1) First Example

Figure 1:
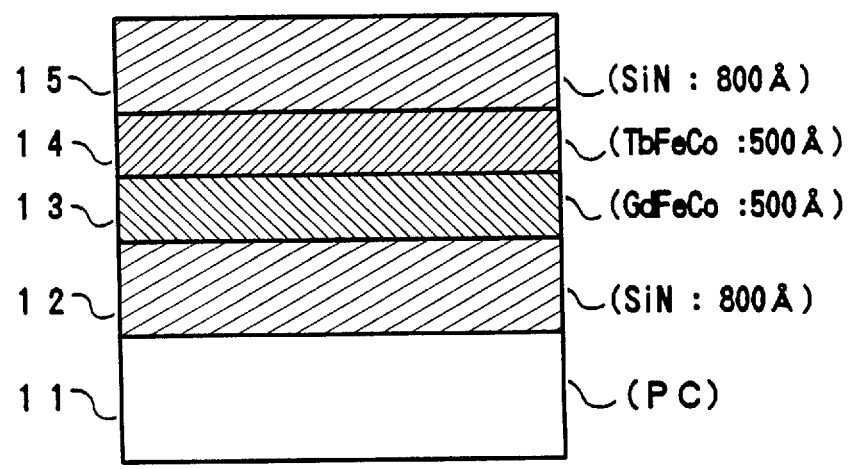
FIG. 1 is a schematic cross-sectional view of a magneto-optical recording medium according to the first and second examples.

FIG. 1 is a schematic illustrating the cross-sectional structure of a magneto-optical recording medium according to the first and second examples.

The magneto-optical recording medium in FIG. 1 includes a polycarbonate (PC) substrate 11, and an interference layer 12 about 800 Å thick made of SiN, a reading layer 13 about 500 Å thick made of GdFeCo, a recording layer 14 about 500 Å thick made of TbFeCo, and an oxidation-preventing layer 15 about 800 Å thick made of SiN, all deposited in this order on the PC substrate 11, and an ultraviolet-setting plastic layer (not illustrated) is further provided on top of the oxidation-preventing layer 15 to a thickness of approximately 20 $\mu$m as a protection layer. Each layer illustrated here can be formed by conventional and well-known sputtering methods or the like.

Figure 2:
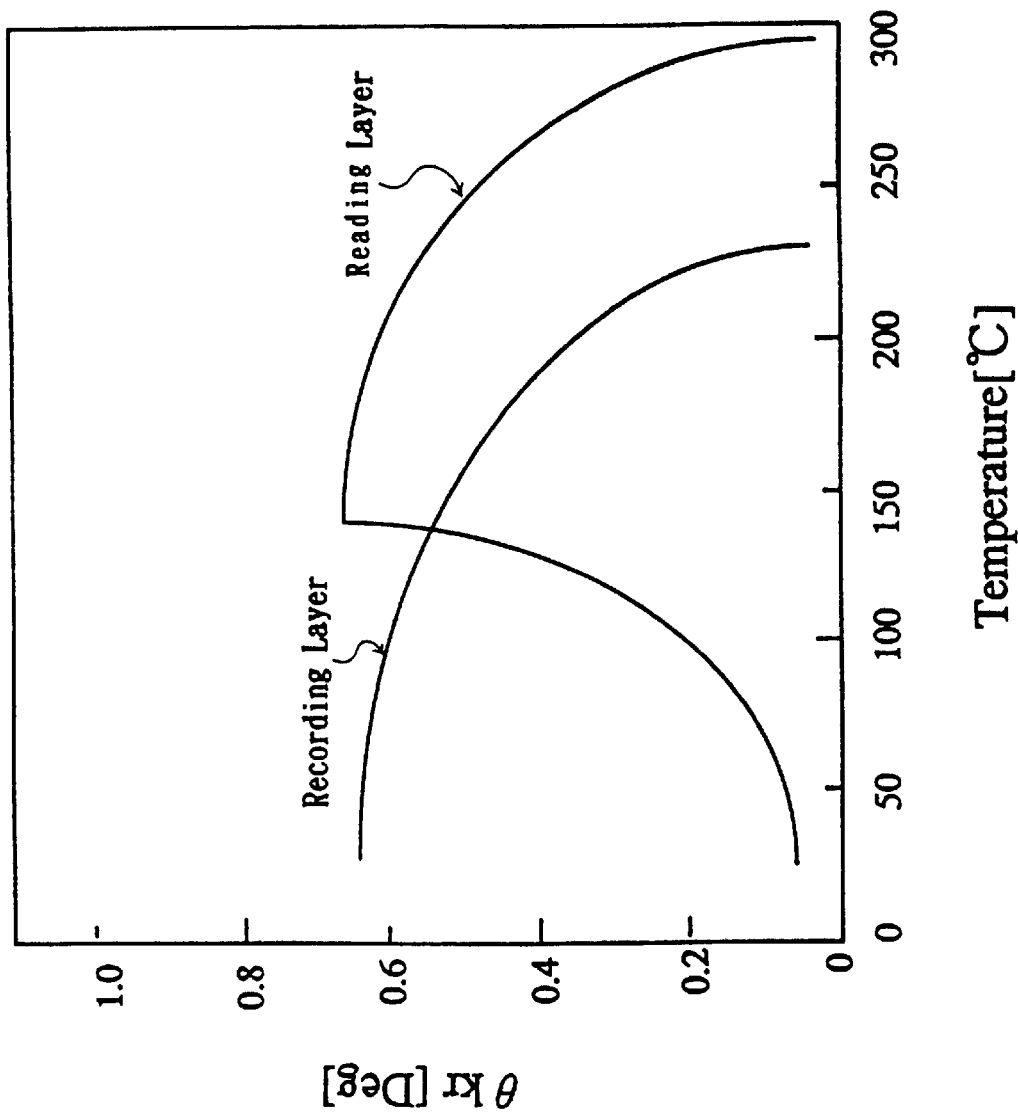
FIG. 2 is a graph illustrating the remanence Kerr rotation angle of the recording layer and reading layer of the magneto-optical recording medium of the first example with temperature taken as the abscissa.

The composition of the reading layer 13 is "Gd:Fe:Co= 31:47:22 atomic percent (at %)," while the composition of the recording layer 14 is "Tb:Fe:Co=26:66:8 at %." The results of measurements of the remanence Kerr rotation angles of the recording layer 14 and reading layer 13 are illustrated in FIG. 2 with temperature taken as the abscissa. As illustrated in FIG. 2, the temperature at which the reading layer 13 becomes a perpendicular magnetization film is about 140° C., and the Curie temperature of the reading layer 13 is about 300° C. The Curie temperature of the recording layer 14 is about 230° C., and the compensation temperature of the recording layer 14 is about room temperature. Reading is achieved by raising the temperature of the target domain of the reading layer 13 to a copying temperature of about 140° C. as described above, and copying the direction of magnetization of the same domain of the recording layer 14 to the reading layer 13 and reading the same domain from the reading layer 13.

Figure 3:
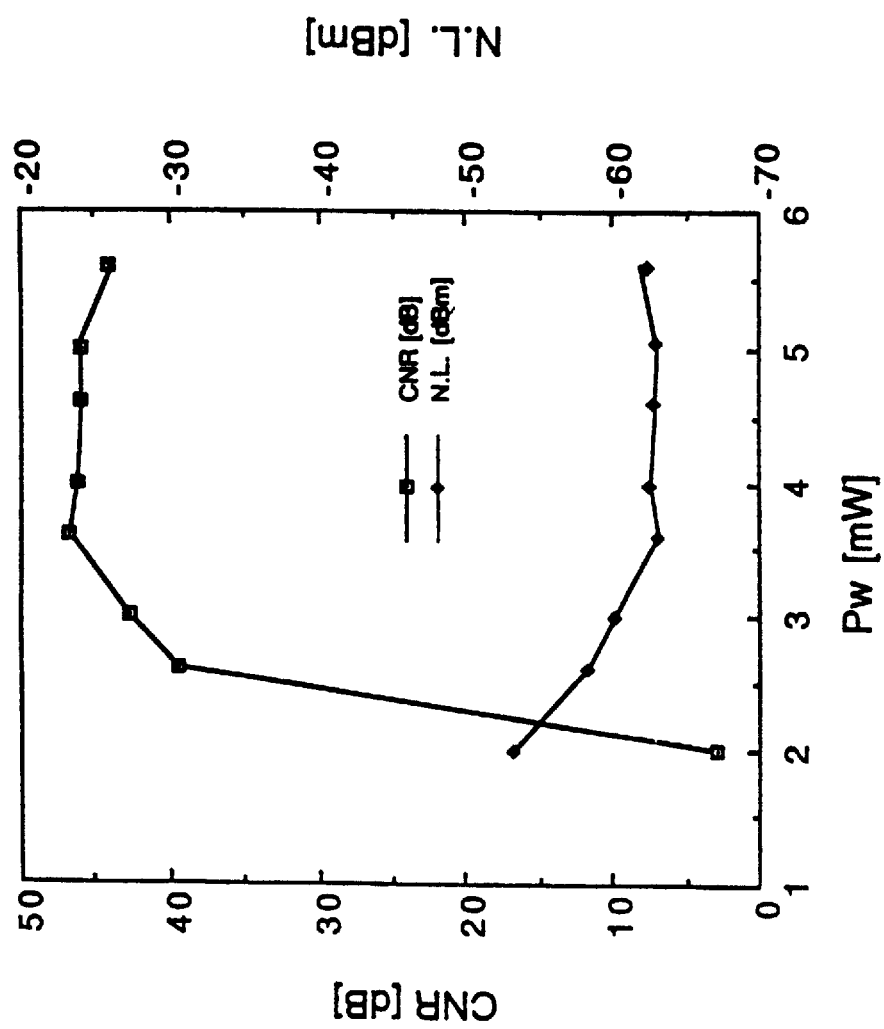
FIG. 3 is a graph illustrating the relations between laser power and noise when the magneto-optical recording medium of the first example is recording.
Figure 4:
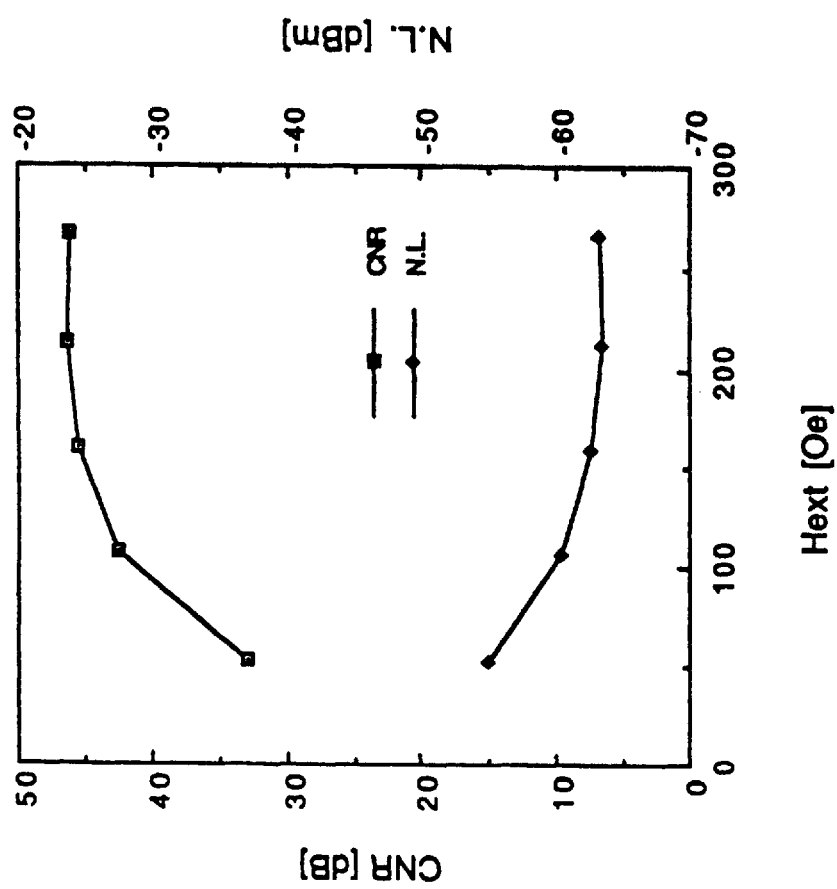
FIG. 4 is a graph illustrating the relations between the external magnetic field and noise when the magneto-optical recording medium of the first example is recording.

In recording, as illustrated in FIG. 3, the CNR saturates when the laser power is 3.5 mW or more, and when this happens, the reading layer 13 is at the Curie temperature or higher. For this reason, as illustrated in FIG. 4, recording can be performed when a low external magnetic field such as 50 Oe is applied, and at 200 Oe or more, the CNR is saturated. Considering that conventionally the application of an external application magnetic field of 500 Oe or more has been necessary for recording (Optical Data Storage 1994, Technical Digest Series, vol. 10, pp. 128–129), it can be understood that the magneto-optical recording medium of this first example can be recorded by applying an extremely small external magnetic field.

(2) Second Example

The cross-sectional view of the second example is the same as that of the first example. The second example differs from the first example in that the composition of the reading layer 13 is "Gd:Fe:Co=31:44:25 at %" and the composition of the recording layer 14 is "Tb:Fe:Co=26:59:15 at %."

Figure 5:
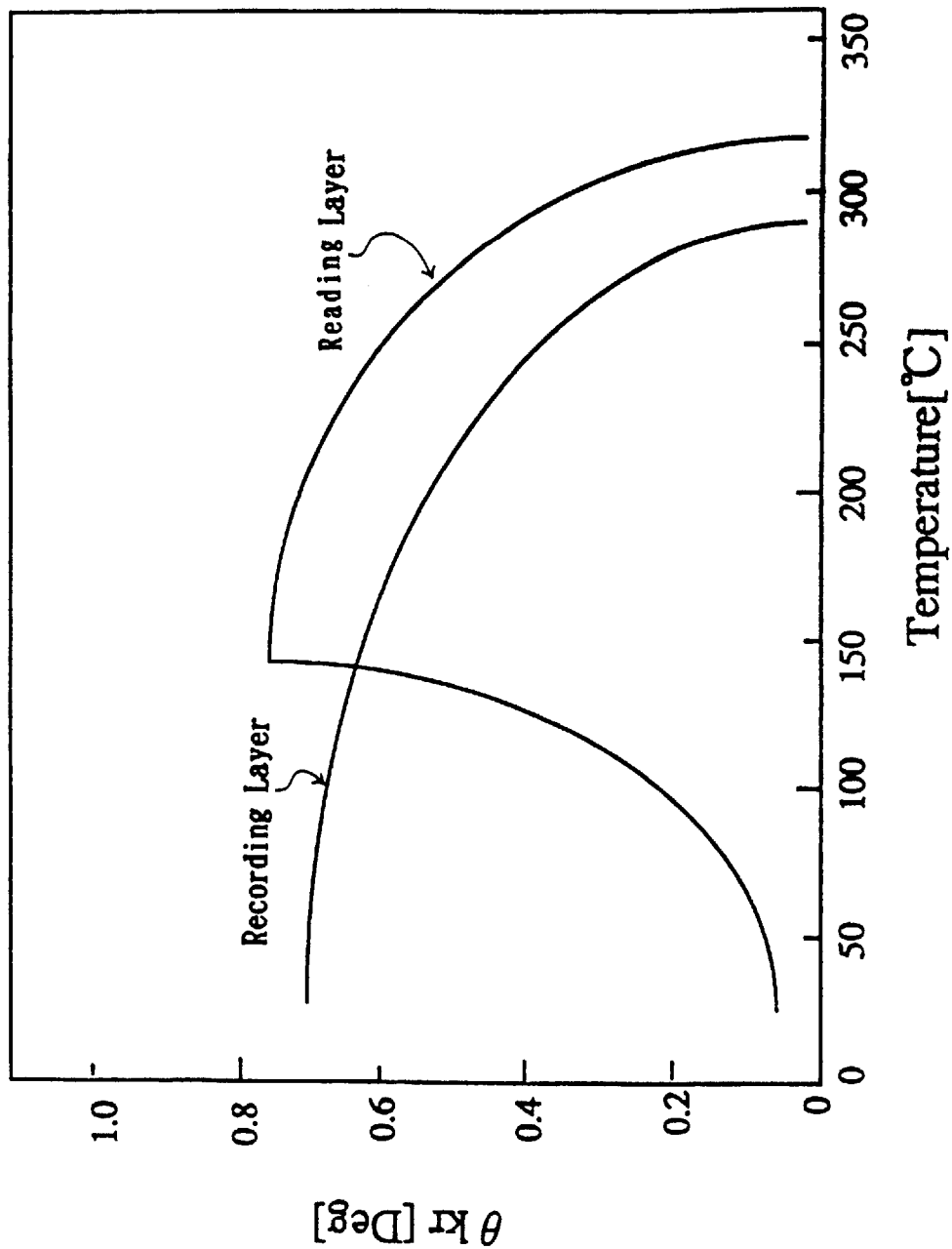
FIG. 5 is a graph illustrating the remanence Kerr rotation angle of the recording layer and reading layer of the magneto-optical recording medium of the second example with temperature taken as the abscissa.

The temperature characteristics of the remanence Kerr rotation angles of the recording layer 14 and reading layer 13 of the above-described compositions for the second example are illustrated in FIG. 5. As illustrated in FIG. 5, the temperature at which the reading layer 13 becomes a perpendicular magnetization film is about 140° C. and the Curie temperature of the reading layer 13 is about 320° C. On the other hand, the Curie temperature of the recording layer 14 is about 290° C., and the compensation temperature of the recording layer 14 is about room temperature. This means that the difference in Curie temperatures between the recording layer 14 and the reading layer 13 is as small as about 30° C. For this reason, when the temperature falls below the Curie temperature of the recording layer 14 in the temperature lowering process during recording, since the temperature is sufficiently higher than the copying temperature of the reading layer 13, the magnetized direction of the reading layer 13 is still perpendicular. Thus, in the reading layer 13, there is no portion where the magnetized direction is the in-plane direction. Therefore, the direction of the magnetization to be copied from the reading layer 13 into the recording layer 14 is also perpendicular, and therefore the CNR is acceptable.

Figure 6:
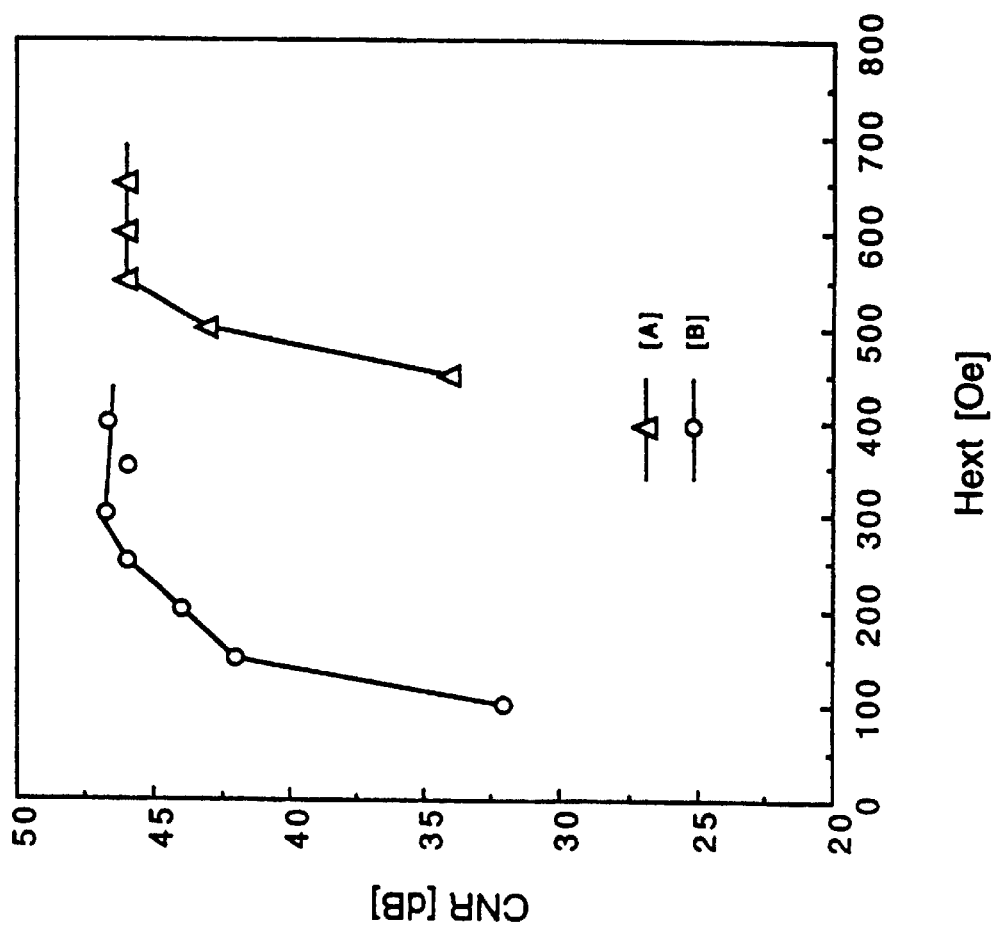
FIG. 6 is a graph illustrating the relations between external magnetic field and CNR when the magneto-optical recording medium of the first example [B] and a conventional magnetic recording medium [A] are recording.

In the case of the second example, as illustrated as [B] in FIG. 6, recording can be performed when a low external magnetic field such as 100 Oe is applied, and the CNR is saturated at a CNR of 250 Oe or more. In FIG. 6, [A] refers to the characteristics of a conventional magneto-optical recording medium with the reading layer 13 being composed of "Gd:Fe:Co=31:34:35 at %" and having a Curie temperature of about 360° C. and the recording layer 14 being composed of "Tb:Fe:Co=26:66:8 at %" and having a Curie temperature of about 230° C. As illustrated in FIG. 6, in the case of the conventional magneto-optical recording medium, recording can be performed when an external magnetic field of 500 Oe or more is applied. Compared with this conventional magneto-optical recording medium, it is understood that the magneto-optical recording medium according to the second example can be recorded by applying an extremely small external magnetic field, much smaller than the external magnetic field needed for the conventional magneto-optical recording medium.

(3) Third Example

Figure 7:
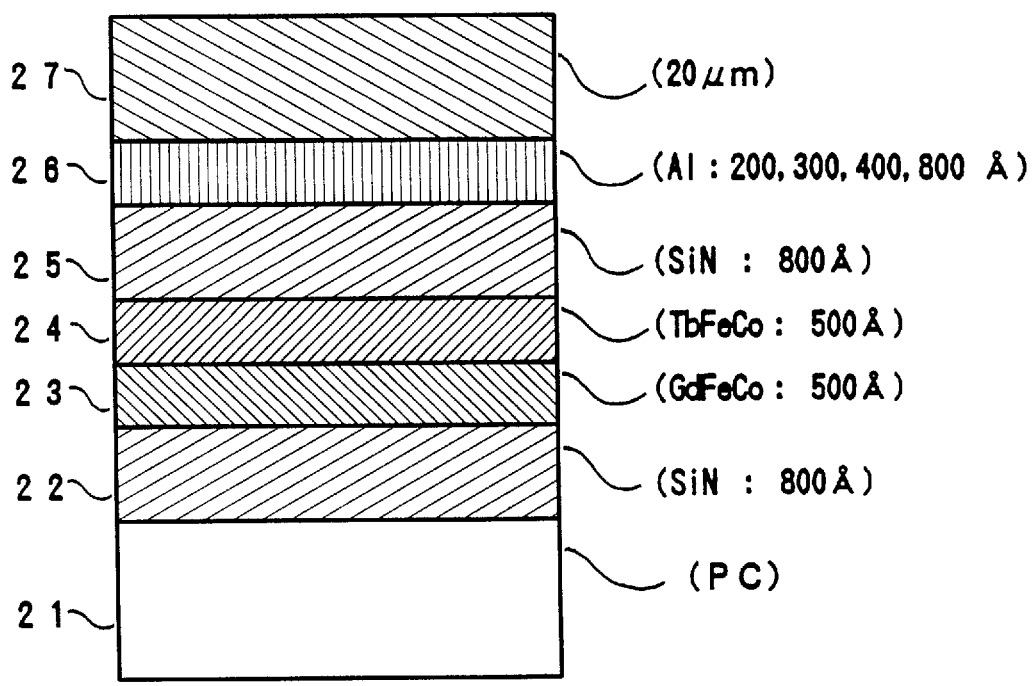
FIG. 7 is a schematic cross-sectional view of a magneto-optical recording medium according to the third example.

FIG. 7 is a schematic illustrating the cross-sectional structure of the magneto-optical recording medium according to the third example.

The magneto-optical recording medium illustrated in this figure includes a polycarbonate (PC) substrate 21 and a high refraction layer 21 about 800 Å thick made of SiN, a reading layer 23 about 500 Å thick made of GdFeCo, a recording layer 24 about 500 Å thick made of TbFeCo, an oxidation-preventing layer 25 about 800 Å thick made of SiN, and a radiation layer 26 about 200 Å thick made of Al, all deposited on the substrate 21 in this order, and a protection layer 27 approximately 20 μm thick made of ultraviolet-setting plastic is further provided on top of the radiation layer 26. Each layer, other than the protection layer 27, can be formed by conventional and well-known sputtering methods or the like.

In addition to the above examples, other magneto-optical recording media variations were manufactured by varying the film thickness of the Al radiation layer 26 from about 200 Å to about 300 Å, 400 Å and 800 Å. Since the exchange-coupled magnetic layer, which includes the recording layer 24 and the reading layer 23, has a total film thickness of about 1000 Å, any of these magneto-optical recording media is of a type that does not sufficiently transmit the laser beam, i.e., that absorbs the reflected laser beam from the magnetic layer. While reading, the direction of the magnetization of the target domain of the recording layer 24 is copied into the reading layer 23.

In each of the magneto-optical recording media described above, when the temperature of a target domain of the reading layer 23 is raised by focusing the laser spot onto the target domain through the substrate 21, the direction of the magnetization of a corresponding domain of the recording layer 24 is copied into an area where the temperature of the reading layer 23 has exceeded its copying temperature (about 140° C. for the third example and the variations). By making use of this phenomenon, the information is read from the recording layer 24. Here, however, as the temperature at which the spontaneous magnetization of the recording layer 24 is demagnetized is about 250° C., the information in the recording layer 24 is retained at the copying temperature described above.

Furthermore, in the third example and the variations, the copying temperature of about 140° C. of the reading layer 23 and the temperature of about 400° C. at which the spontaneous magnetization direction of the reading layer 23 is demagnetized are achieved by setting the composition to "Gd:FeCo=32:68 at %," and the temperature of about 250° C. at which the spontaneous magnetization direction of the recording layer 24 is demagnetized is achieved by setting the composition to "Tb:FeCo=25:75 at %."

The recorded information was read from each of the magneto-optical recording media (where only the thickness of the radiation layer 26 differs between each variation as about 200 Å, 300 Å, 400 Å and 800 Å, respectively), the CNR of each magneto-optical recording medium was measured, and the results were compared with a recording medium without the radiation layer 26 shown in FIG. 7, and each of the magneto-optical recording media of the third example and the variations was proven to be better than the recording medium without the radiation layer 26 shown in FIG. 7. Then, in comparisons among the magneto-optical recording media of the third example and the variations, that with about a 300 Å thick radiation layer 26 was better than that with about a 200 Å thick radiation layer 26, but those with about 300 Å, 400 Å and 800 Å thick radiation layers 26 were proven to be almost the same. From these results, it is understood that the thickness of the Al radiation layer 26 is acceptable at about 200 Å but is preferable at about 300 Å or more.

Figure 8:
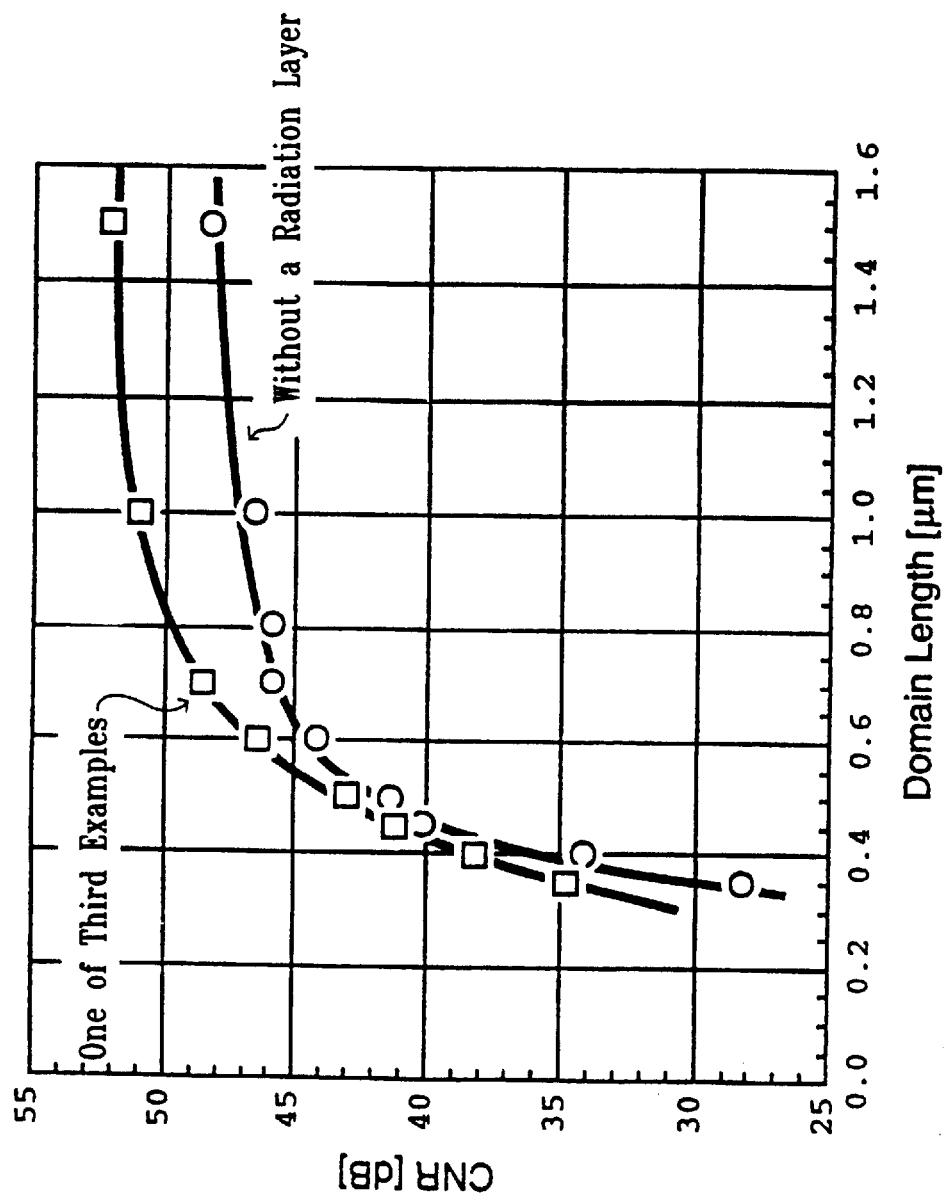
FIG. 8 is a graph illustrating the CNR of the reading signal of the magneto-optical recording medium according to the third examples.

FIG. 8 is a graph illustrating the CNR of the reading signal of the magneto-optical recording medium according to one of the third example variations (where the thickness of the radiation layer 26 is about 400 Å) and the magneto-optical recording medium without the radiation layer 26 shown in FIG. 7, with the recording domain length taken as the abscissa. As illustrated in FIG. 8, it is understood that improvements are conspicuous when the recording domain lengths are about 0.8 μm or more and about 0.4 μm or less. This is presumably because the heat of the reading layer 23 flows to the radiation layer 26, thereby improving the temperature distribution, and, as a result, noise due to the disorder of the direction of the magnetization, or excessive reading from the circumferential area of the laser spot (where the temperature is low), is reduced.

In the structure of the third example and the variations illustrated in FIG. 7, two or more recording media were prepared by changing the composition ratio of the reading layer 23 from Gd=30 at % (the copying temperature in this case is approximately 70° C.) to Gd=33 at % (the copying temperature in this case is approximately 160° C.), and the CNR was measured in substantially the same way as described above, and substantially the same results were obtained.

Furthermore, instead of Al, other materials such as Ag, Cu, Au, W and Mg, having a high thermal conductivity, were used, and similar results to the above-given results were obtained.

(4) Fourth Example

Figure 9:
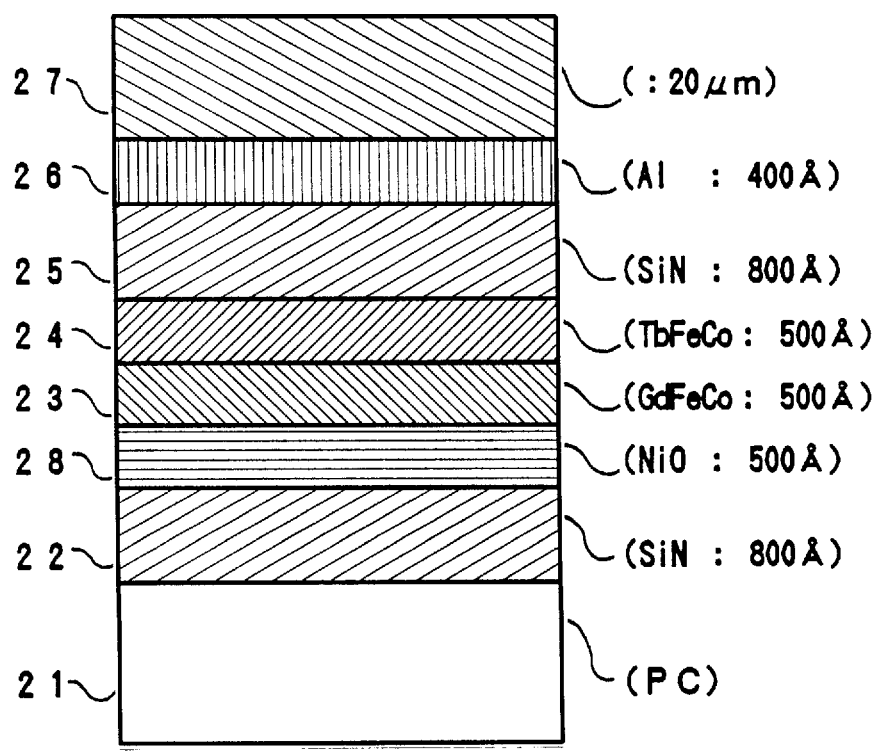
FIG. 9 is a schematic cross-sectional view of a magneto-optical recording medium according to the fourth example.

FIG. 9 is a schematic illustrating the cross-sectional structure of a magneto-optical recording medium according to the fourth example.

The magneto-optical recording medium according to the fourth example is different from that of the third example and the variations only in that a magnetic layer 28, which is an in-plane magnetization film, made of NiO about 500 Å thick, is provided between a high refraction layer 22 made of SiN and a reading layer 23 made of GdFeCo; any other part of the structure is the same as the corresponding part of the structure of the third example or the variations. Here, the radiation layer 26 is made of Al with a thickness of about 400 Å.

The in-plane magnetization film magnetic layer 28 is a layer in which the direction of the magnetization is in parallel with the layer surface within a range from about room temperature to about the Neel temperature (about 100° C. in this example). Furthermore, as the magnetic layer 28 is made of NiO with a thickness of about 500 Å, the magnetic layer 28 is sufficiently transparent to transmit the laser beam reflected from the reading layer 23 to the substrate 21.

This magnetic layer 28 is provided to improve the CNR of the reading signal by aligning the initial direction of the magnetization of the reading layer 23 parallel to the magnetic layer 28. That is, the initial direction of the magnetization of the reading layer 23 cannot completely become the in-plane direction due to the fact that the recording layer 24 is a perpendicular magnetization film and is magnetically coupled to the reading layer 23. However, when the direction of the magnetization of the reading layer 23 changes from the in-plane direction to the perpendicular direction, the initial state of the reading layer 23 has an effect on this process of magnetization direction change. Considering this fact, an in-plane magnetization film magnetic layer 28 is provided to reduce noise due to the disordered direction of the magnetization and crosstalk noise due to excessive reading of the signal from the low-temperature area.

The effect of the in-plane magnetization film magnetic layer 28 described above can further be heightened by properly selecting the Curie temperature or the Neel temperature. Here, as a material for the in-plane magnetization film magnetic layer 28, instead of NiO as described above, CoNiO, CoO, MnFe, FeCr, FeNi, MnNi, PtCo and PdCo may also be used as alternative materials.

The CNR of the reading signal of the magneto-optical recording medium according to the fourth example was measured in substantially the same way as the measurement of the CNR of the third example and the variations, and an acceptable CNR was obtained. Then, a recording medium with no radiation layer 26 in FIG. 9 was prepared, and the CNR was compared with this fourth example. As a result, the CNR of the recording medium of the fourth example was better than that of the recording medium with no radiation layer 26.

(5) Fifth Example

Figure 10:
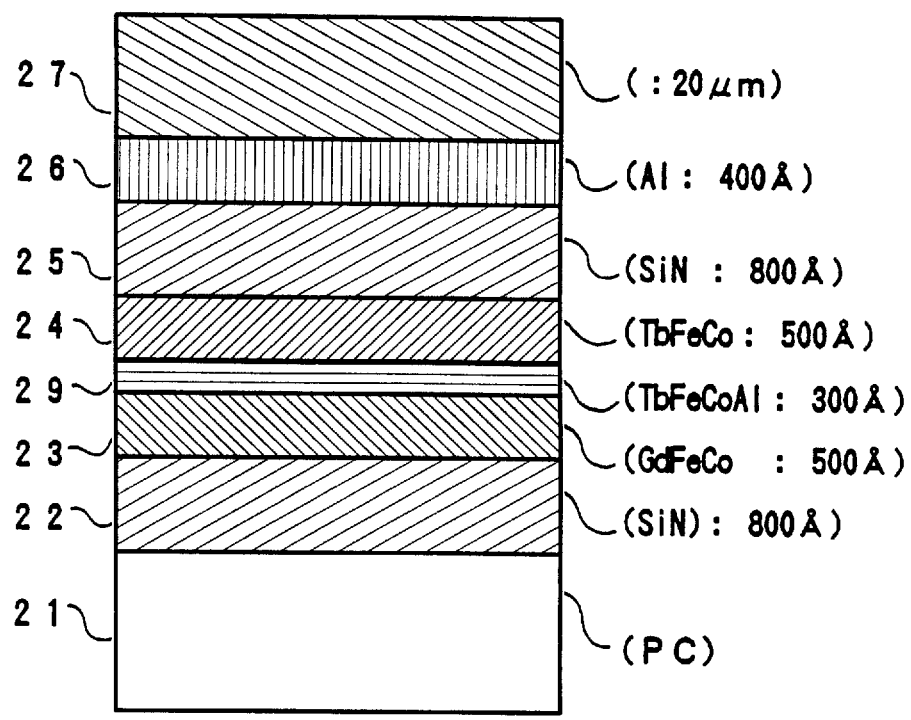
FIG. 10 is a schematic cross-sectional view of a magneto-optical recording medium according to the fifth example.

FIG. 10 is a schematic illustrating the cross-sectional structure of a magneto-optical recording medium according to the fifth example.

The magneto-optical recording medium according to the fifth example is different from the fourth example only in that the in-plane magnetization film magnetic layer 28 made of NiO is not provided, and a cut-off magnetization layer 29 about 300 Å thick made of TbFeCoAl is provided between a reading layer 23 made of GdFeCo and a recording layer 24 made of TbFeCo; any other part of the structure is the same as the corresponding part of the structure of the fourth example. Here, Al about 400 Å thick is used as a radiation layer 26 in substantially the same way as the fourth example.

In the case of the cut-off magnetization layer 29 described above, the temperature at which spontaneous magnetization is demagnetized is about 190° C., which is a temperature set lower than that at which the spontaneous magnetization of the recording layer 24 is demagnetized. In this fifth example, the temperature of about 190° C. is achieved by setting the Al content to about 17 at %.

This cut-off magnetization layer 29 is designed to protect the recording of the information into the recording layer 24 from the effect of the thermal magnetic characteristics of the reading layer 23. That is, when the area whose temperature is raised by the irradiation of the laser spot of recording power falls to about 250° C. (the temperature at which the spontaneous magnetization of the recording layer 24 is demagnetized) or less in the temperature reducing process, as the magnetization of the cut-off magnetization layer 29 is about 0 at this temperature of about 250° C., the magnetized direction of the recording layer 24 is in the direction of the external magnetic field independently from the reading layer 23. When the temperature further falls to about 190° C. (the temperature at which the spontaneous magnetization of the cut-off magnetization layer 29 is demagnetized) or less, the direction of the magnetization of the cut-off magnetization layer 29 follows the direction of the magnetization of the recording layer 24. Therefore, when the copying temperature during reading is a little more than about 140° C., which is under about 190° C., the cutoff magnetization layer 29 behaves in substantially the same way as the recording layer 24. Here, as a material for the cut-off magnetization layer 29, in addition to TbFeCoAl as described above, TbFeCoNb, TbFeCoCr and TbFeCoNi may also be used as an alternative material.

The CNR of the reading signal of the magneto-optical recording medium according to the fifth example was measured in substantially the same way as the measurement of the CNR of the third example and the variations, and an acceptable CNR was obtained. Then, a recording medium with no radiation layer 26 in FIG. 10 was prepared, and the CNR was compared with this fifth example. As a result, the CNR of the recording medium of the fifth example was better than that of the recording medium with no radiation layer 26.

(6) Sixth Example–Fourteenth Example

Figure 11:
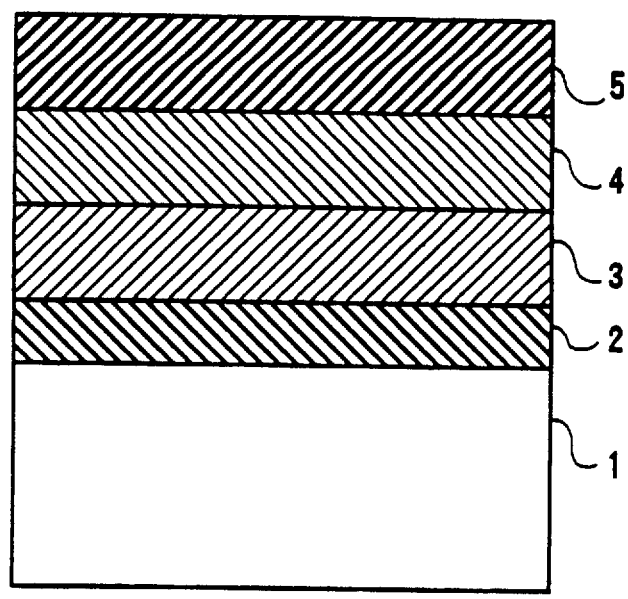
FIG. 11 is a schematic cross-sectional view of a magneto-optical recording medium according to the sixth through fourteenth examples.

Now, the sixth through fourteenth examples will be described. The cross-sectional structure of magneto-optical recording media according to the sixth through fourteenth examples is illustrated in FIG. 11. Specifically, on a polycarbonate (PC) transparent substrate 1 an interference layer 2 made of SiN, a reading layer 3 made of GdFeCo, a recording layer 4 made of TbFeCo and a protection layer 5 made of SiN are all formed in this order. This structure can be made by conventional and well-known sputtering methods or the like. In the thirteenth example, on the protection layer 5, a radiation layer (not illustrated) about 200 Å thick, made of Al, is formed.

(6-1) Composition

The composition of a comparison example and the sixth through fourteenth examples will be described.

(6-1-1) Example for comparison

In the comparison example, the interference layer 2 is formed to a thickness of about 800 Å, the reading layer 3 is formed to a thickness of about 500 Å, the recording layer 4 is formed to a thickness of about 500 Å and the protection layer 5 is formed to a thickness of about 800 Å.

The composition of the reading layer 3 is Gd:Fe:Co= 23:65.5:11.5 at %. The composition of the recording layer 4 is Tb:Fe:Co=26:66:8 at %.

(6-1-2) Sixth Example

In the sixth example, the interference layer 2 is formed to a thickness of about 800 Å, the reading layer 3 is formed to a thickness of about 500 Å, the recording layer 4 is formed to a thickness of about 500 Å and the protection layer 5 is formed to a thickness of about 800 Å.

The composition of the reading layer 3 is Gd:Fe:Co= 31:46:23 at %. The composition of the recording layer 4 is Tb:Fe:Co=26:66:8 at %.

Thus, the sixth example differs from the comparison example in the composition of the reading layer 3.

(6-1-3) Seventh Example

The seventh example is substantially the same as the sixth example in the film thicknesses of the interference layer 2, reading layer 3, recording layer 4 and protection layer 5, and in the composition of the reading layer 3 and recording layer 4.

The seventh example differs from the sixth example in that when the interference layer 2 is formed, the surface of the interference layer 2 is etched, and then the reading layer 3 is formed.

The etching conditions are a sputtering gas pressure of about 1.2 mTorr for backward sputtering, a power supply of about 100 W and an etching time of about 20 min.

(6-1-4) Eighth Example

The eighth example is substantially the same as the sixth example in the film thicknesses of the reading layer 3, recording layer 4 and protection layer 5, and in the composition of the reading layer 3 and recording layer 4.

The eighth example differs from the sixth example in that the thickness of the interference layer 2 is about 700 Å.

(6-1-5) Ninth Example

The ninth example is substantially the same as the eighth example in the film thicknesses of the interference layer 2, recording layer 4 and protection layer 5, and in the composition of the reading layer 3 and recording layer 4.

The ninth example differs from the eighth example in that the thickness of the reading layer 2 is about 1000 Å.

(6-1-6) Tenth Example

The tenth example is substantially the same as the ninth example in the film thicknesses of the interference layer 2, reading layer 3, recording layer 4 and protection layer 5, and in the composition of the reading layer 3.

The tenth example differs from the ninth example in that the composition of the recording layer 4 is Tb:Fe:Co= 25:62:13 at %.

(6-1-7) Eleventh Example

The eleventh example is substantially the same as the tenth example in the film thicknesses of the interference layer 2, reading layer 3, recording layer 4 and protection layer 5, and in the composition of the recording layer 4.

The eleventh example differs from the tenth example in that the composition of the reading layer 3 is Gd:Fe:Co= 34:44:22 at %.

(6-1-8) Twelfth Example

The twelfth example is substantially the same as the eleventh example in the film thicknesses of the interference layer 2, reading layer 3, recording layer 4 and protection layer 5, and in the composition of the reading layer 3 and recording layer 4.

The twelfth example differs from the eleventh example in that when the interference layer 2 is formed, the surface of the interference layer 2 is etched, and then the reading layer 3 is formed.

The etching power intensity is about 0.05 W/cm$^2$.

(6-1-9) Thirteenth Example

The thirteenth example is substantially the same as the twelfth example in the film thicknesses of the interference layer 2, reading layer 3, recording layer 4 and protection layer 5, and in the composition of the reading layer 3 and recording layer 4, and in the fact that the surface of the interference layer 2 is etched by an etching power intensity of about 0.05 W/cm$^2$ and then the reading layer 3 is formed.

The thirteenth example differs from the twelfth example in that a radiation layer made of Al with a thickness of about 200 Å is formed on the protection layer 5.

(6-1-10) Fourteenth Example

The fourteenth example is substantially the same as the eleventh example in the film thicknesses of the interference layer 2, reading layer 3, recording layer 4 and protection layer 5, and in the composition of the reading layer 3 and recording layer 4.

The fourteenth example differs from the eleventh example in that the sputtering gas pressure for the formation of the reading layer 3 is about 3.5 mTorr while the sputtering gas pressure for the formation of the reading layer 3 of the eleventh example is about 7 mTorr.

(6-2) Characteristics

Now, various characteristics of the magneto-optical recording media according to the above-described comparison example and the sixth through fourteenth examples will be described.

(6-2-1) Sixth Example to Comparison Example

Figure 12:
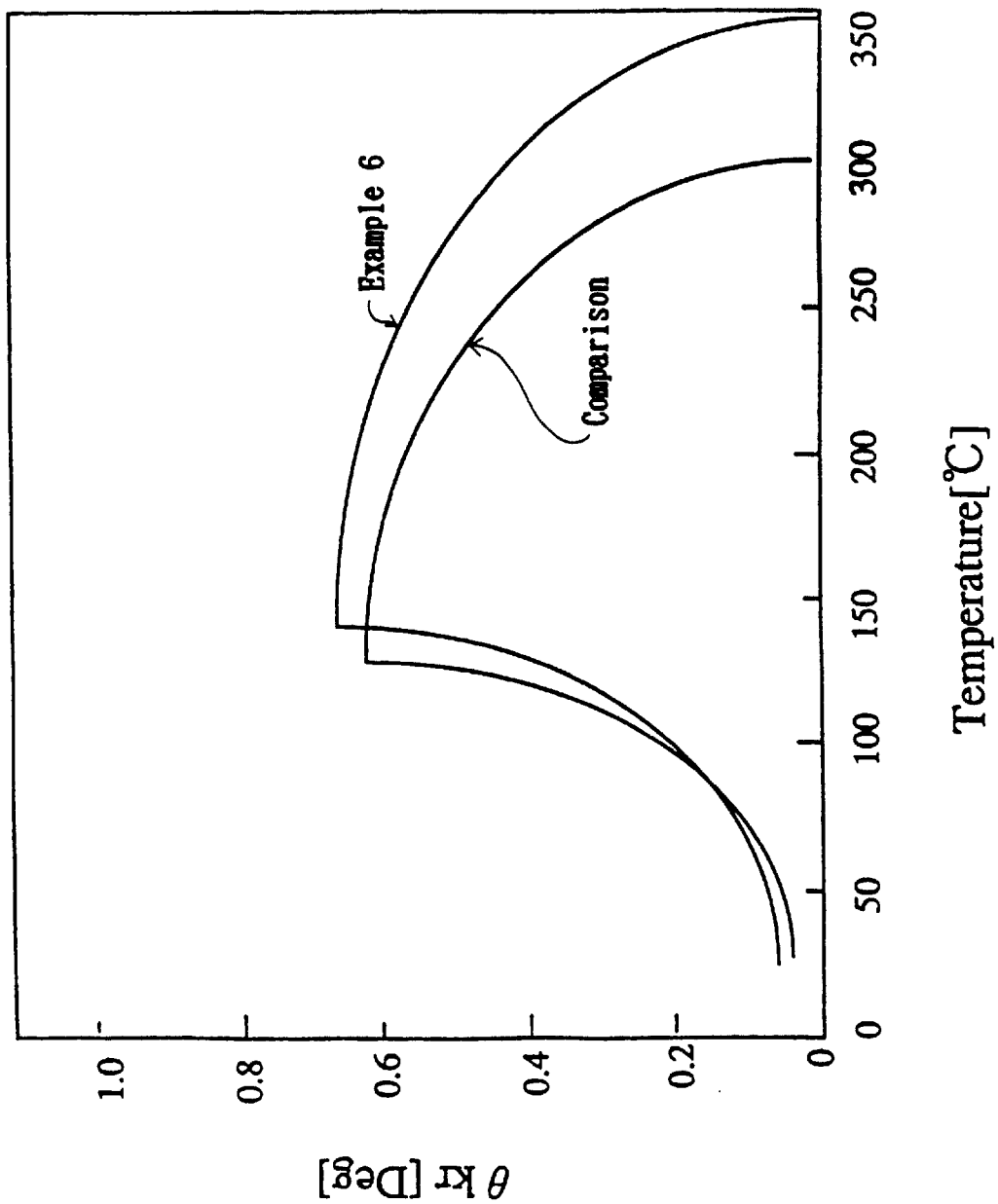
FIG. 12 is a graph illustrating the remanence Kerr rotation angle of the recording layer and reading layer of the magneto-optical recording medium of the sixth example compared with a conventional magneto-optical recording medium with temperature taken as the abscissa.

FIG. 12 is a temperature characteristic diagram of the Kerr rotation angle of the comparison example and sixth example.

The temperature at which the reading layer 3 of the magneto-optical recording medium according to the sixth example changes to a perpendicular magnetization layer was about 140° C., in other words, the copying temperature of the reading layer 3 was about 140° C., and the Curie temperature was about 350° C., while the Curie temperature of the comparison example was about 300° C.

When the laser beam spot is focused onto the reading layer 3 through the substrate 1 and thereby the temperature of the reading layer 3 is raised to the copying temperature, the direction of the magnetization of the recording layer 4 is copied into the reading layer 3 in the area that has exceeded the copying temperature. The copying temperature of the reading layer 3 of the sixth example is about 140° C. By making use of this phenomenon, the reading of the information of the recording layer 4 is performed in the respective magneto-optical recording media according to the sixth through the fourteenth examples and the comparison example.

Figure 13:
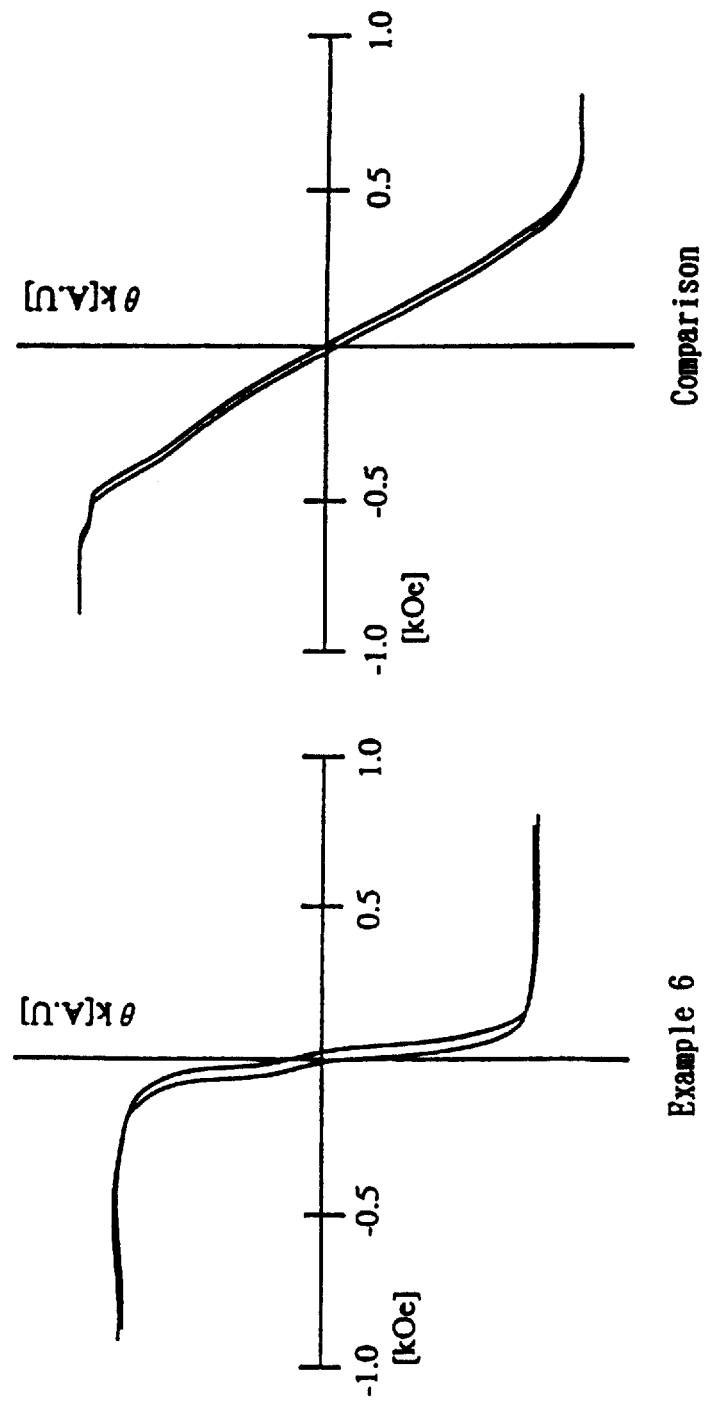
FIG. 13 shows graphs illustrating the Kerr loops near the vicinity of the Curie temperature of the magneto-optical recording medium according to the sixth example compared with a conventional magneto-optical medium.

FIG. 13 illustrates the Kerr loop around the Curie temperatures of the sixth example and comparison example.

As illustrated in FIG. 13, the saturation magnetic field of the comparison example at a temperature of about 280° C. is approximately 500 Oe, while the saturation magnetic field of the sixth example at a temperature of about 330° C. is approximately 100 Oe. The magnitude of the saturation magnetic field at a temperature that is slightly lower than the Curie temperature relates to the magnitude of the external magnetic field that is necessary for recording. In other words, the larger the magnitude of the saturation magnetic field, the larger the magnitude of the external magnetic field that is necessary for recording. Here, the temperature that is slightly lower than the Curie temperature is about 330° C. for the sixth example, and is about 280° C. for the comparison example.

Figure 14:
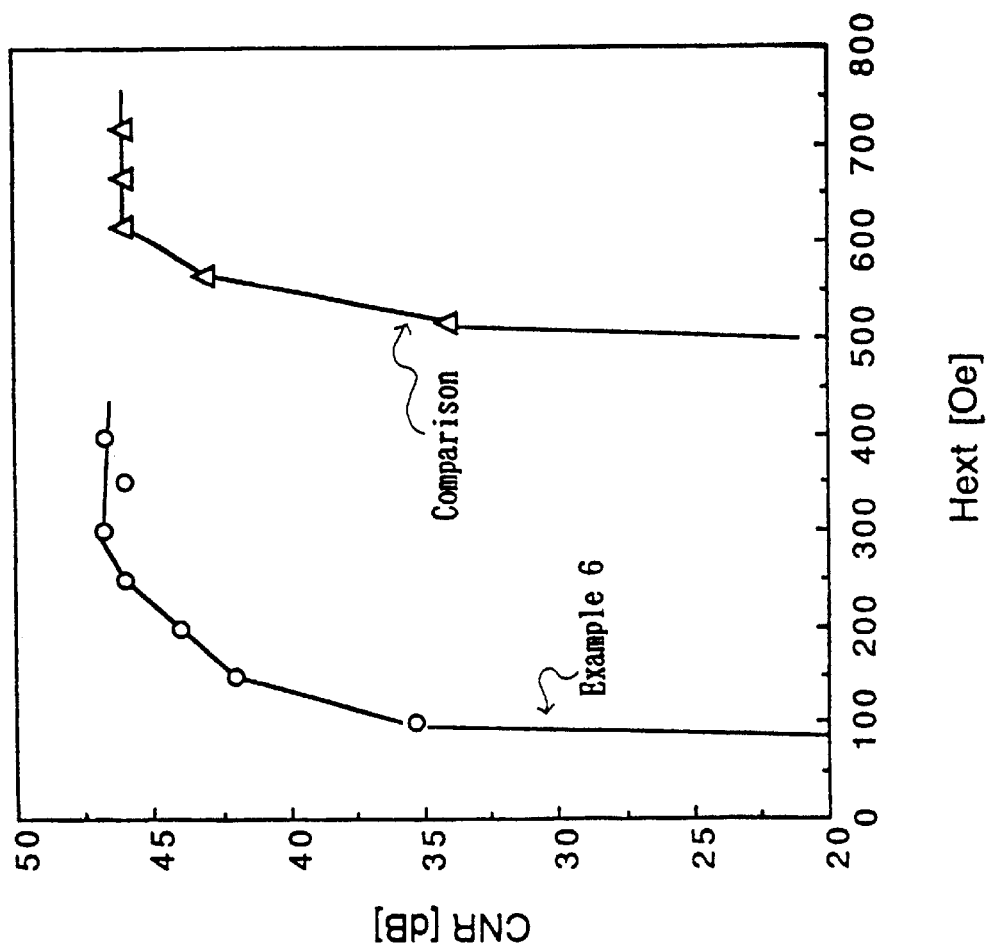
FIG. 14 is a graph illustrating the magnetic modulation recordings according to the sixth example compared with the prior art.

FIG. 14 shows a CNR characteristic of the reading signal of the sixth example and the comparison example where the recording is performed by applying a modulated magnetic field. As illustrated in FIG. 14, with the comparison example, unless an external magnetic field of about 500 Oe or more was applied, recording was impossible. With the sixth example, however, the CNR could be saturated by applying as small an external magnetic field as about ±200 Oe or so, and even if the external magnetic field was as small as about ±80 Oe or so, the recording was still possible.

In the sixth example, where the relative amount of Co as a component of the reading layer 3 is changed to more than about 50 at %, even when the temperature is raised, the reading layer 3 is not changed to the perpendicular magnetization film, and an object of the present invention can still be achieved.

In the sixth example, although the reading layer 3 is composed of GdFeCo, even when the reading layer 3 is composed of a four-component material, such as GdFeCoCr, GdFeCoNi, GdFeCoTi, GdFeCoAl and GdFeCoMn, or a five-component material, such as GdFeCoNiCr and GdFeCoAlTi, substantially the same effect as that of the sixth example can be obtained.

(6-2-2) Sixth Example to Seventh Example

Figure 15:
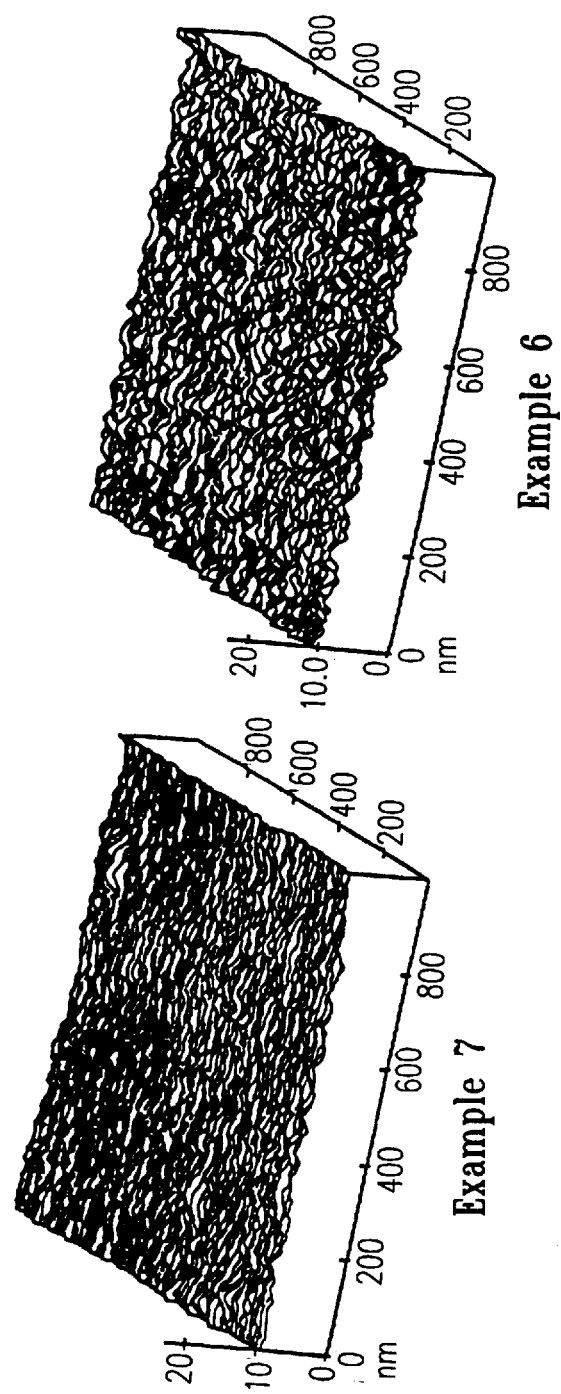
FIG. 15 shows plan views of the surfaces of interference layers of the sixth and seventh examples obtained through an interatomic force microscope.

FIG. 15 shows plan views of the surfaces of interference layers (ground layer) 2 of the sixth and seventh examples obtained through an interatomic force microscope (AFM). From this figure, it is understood that the surface of the interference layer 2 of the seventh example is smoother than that of the sixth example. For this reason, the pinning power of the reading layer 3 and recording layer 4 formed on the surfaces smoothed by the backward sputtering type etching processing degrades, facilitating the movement of the magnetic domain walls.

Figure 16:
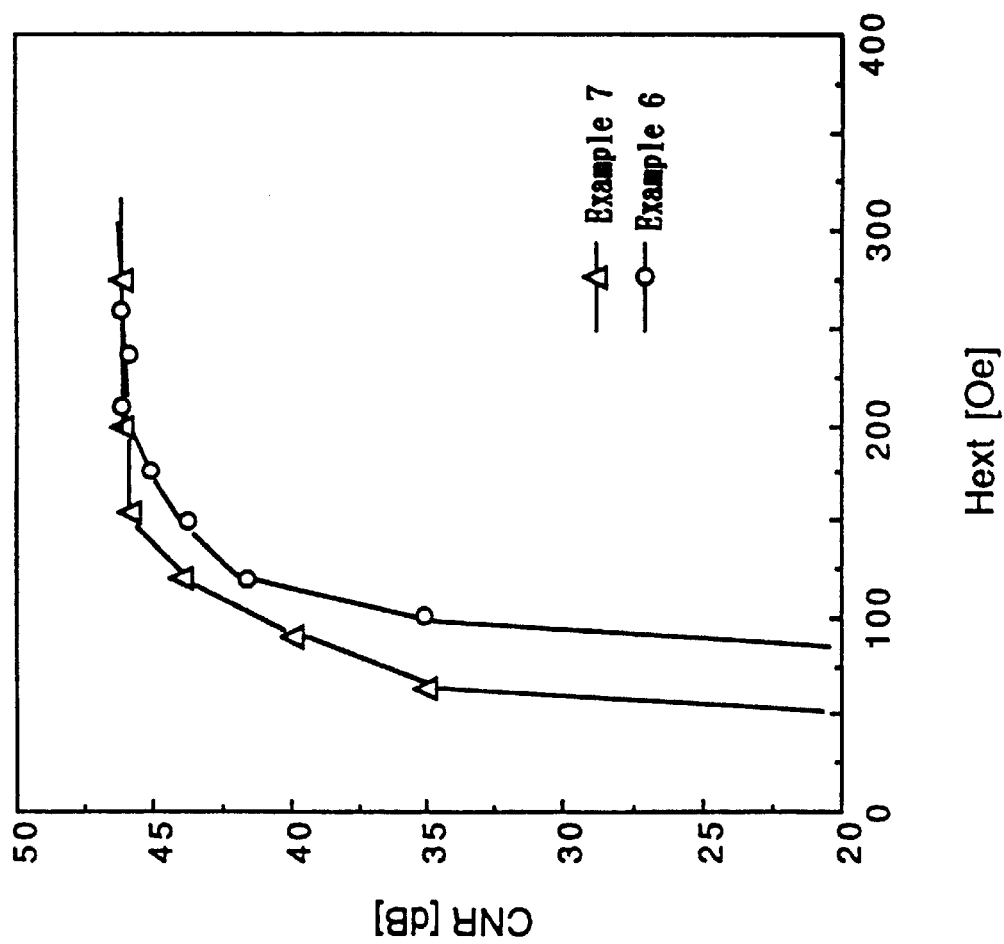
FIG. 16 is a graph illustrating the CNR of the reading signal for the external magnetic field according to the sixth and seventh examples.

FIG. 16 shows a CNR characteristic of the reading signal of the sixth and seventh examples where the recording is performed by applying a modulated magnetic field. From this figure, it is understood that the sixth example can be recorded from when the external magnetic field is as small as about ±80 Oe, while the seventh example can be recorded from when the external magnetic field is as still small as about ±50 Oe. This is presumably an effect of forming the reading layer 3 after smoothing the surface of the ground layer 2 by etching.

(6-2-3) Sixth Example to Eighth Example

Figure 40:
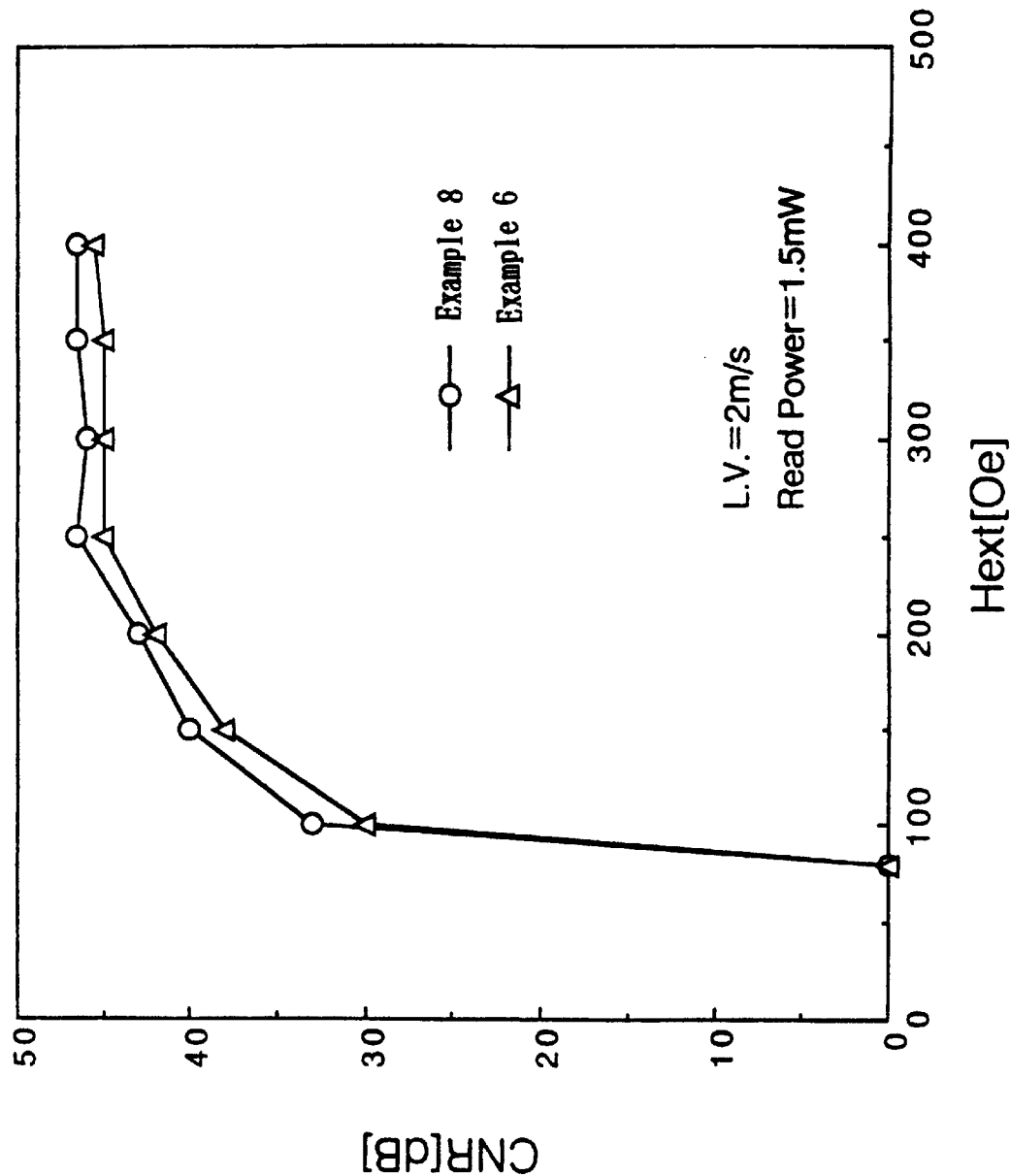
FIG. 40 is a graph illustrating the CNR of the reading signal for the external magnetic field according to the sixth and eighth examples.

FIG. 40 shows a CNR characteristic of the reading signal of the sixth and eighth examples where the recording is performed by applying a modulated magnetic field. From this figure, it is understood that the eighth example can be recorded from when the external magnetic field is as small as about ±80 Oe as can the sixth example, and, in addition to this, the recording characteristics of the eighth example have been further improved. This is presumably an effect of forming the interference layer 2 slightly thinner than the interference layer 2 of the sixth example. When the thickness of the interference layer 2 was within a range of about 600–800 Å, acceptable recording characteristics could indeed be obtained.

(6-2-4) Eighth Example to Ninth Example

Figure 41:
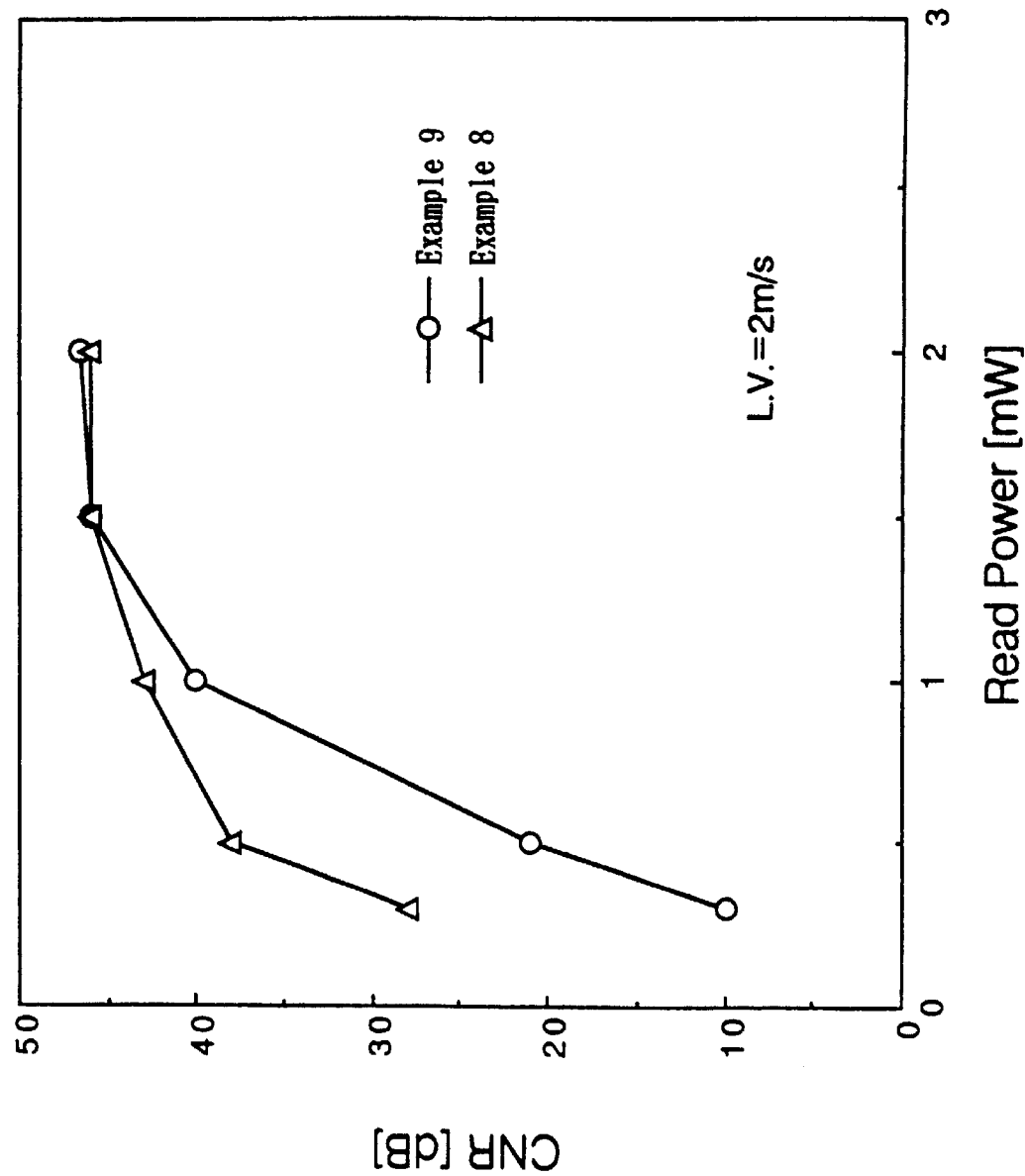
FIG. 41 is a graph illustrating the CNR of the reading signal for the reading laser power according to the eighth and ninth examples.

FIG. 41 shows a CNR characteristic of the reading signal of the eighth and ninth examples when the reading laser power is changed. From this figure, it is understood that the CNR of the ninth example steeply changes at around the point when the reading laser power is 1.5 mW, which is a better characteristic than that of the eighth example. This is presumably an effect of setting the thickness of the reading layer 3 to be about 1000 Å, which is thicker than the reading layer 3 of the eighth example. It was confirmed that such an effect where the CNR of the reading signal steeply changed at around a certain value of the reading laser power (about 1.5 mW for the ninth example) could sufficiently be obtained when the thickness of the reading layer 3 was set to a range of about 800–1200 Å.

(6-2-5) Ninth Example to Tenth Example

Figure 42:
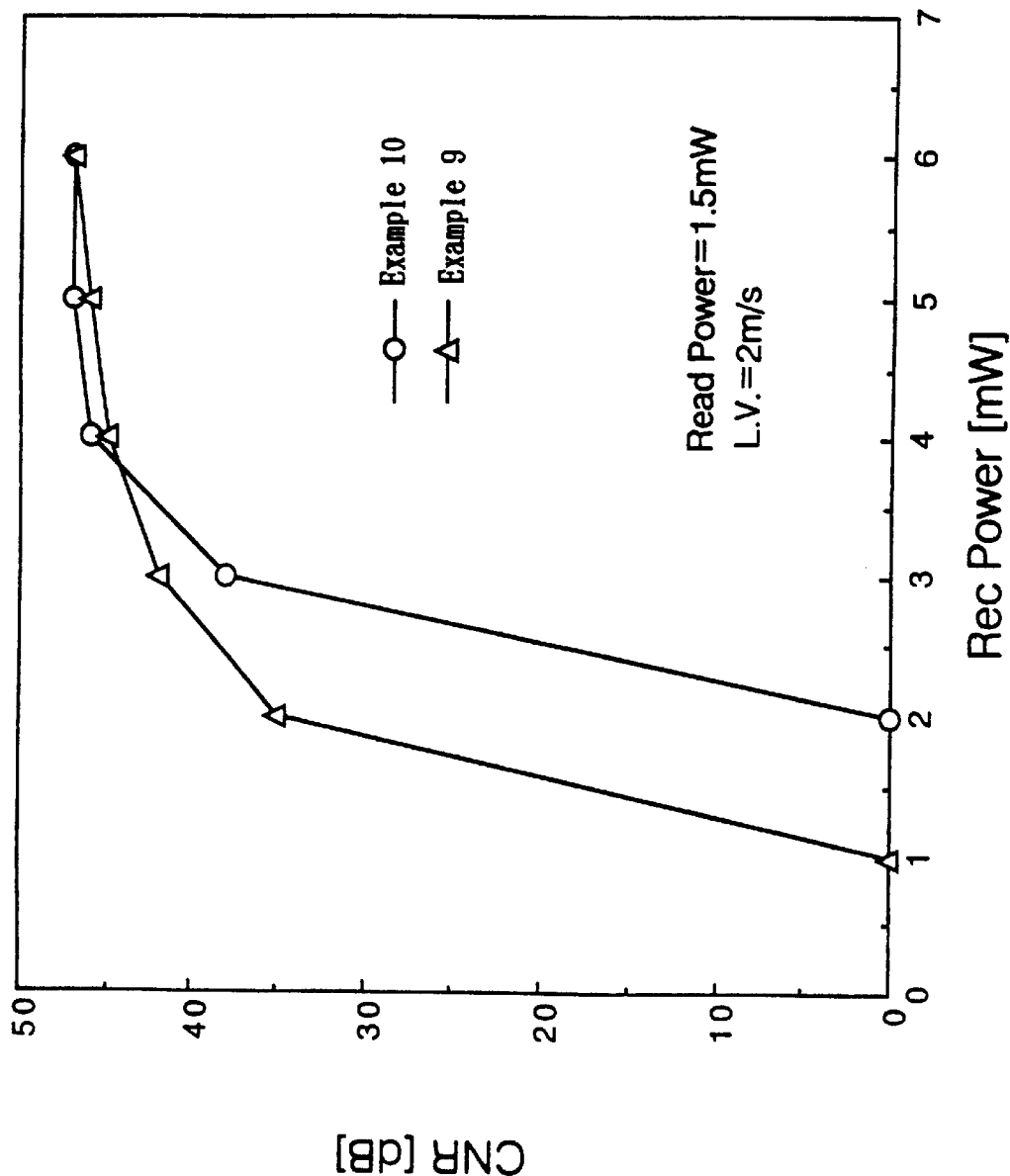
FIG. 42 is a graph illustrating the CNR of the reading signal for the recording laser power according to the ninth and tenth examples.

FIG. 42 shows a CNR characteristic of the reading signal of the ninth and tenth examples when the recording laser power is changed. Here, the laser power for the reading is about 1.5 mW. As illustrated in FIG. 42, in the case of the tenth example in which the relative amount of Co of the recording layer 4 is different from that of the ninth example, when the recording laser power is smaller than about 3 mW, which is sufficiently bigger than the reading laser power of about 1.5 mW, the CNR of the reading signal sufficiently lowers. In the case of the ninth example, however, only when the recording laser power is smaller than about 2 mW, which is a little bigger than the reading laser power of about 1.5 mW, is the CNR of the reading signal sufficiently lowered. Thus, the possibility of an adverse effect on the recorded signal, due to irradiation of the laser beam of the reading power, is smaller in the tenth example than the ninth example. This is presumably an effect of setting the relative amounts of Co of the recording layer 4 to be larger in the tenth example than in the ninth example. Such an effect could indeed be sufficiently obtained when the component ratio of Co of the recording layer 4 was set to a range of about 10–16 at %.

(6-2-6) Tenth Example to Eleventh Example

Figure 43:
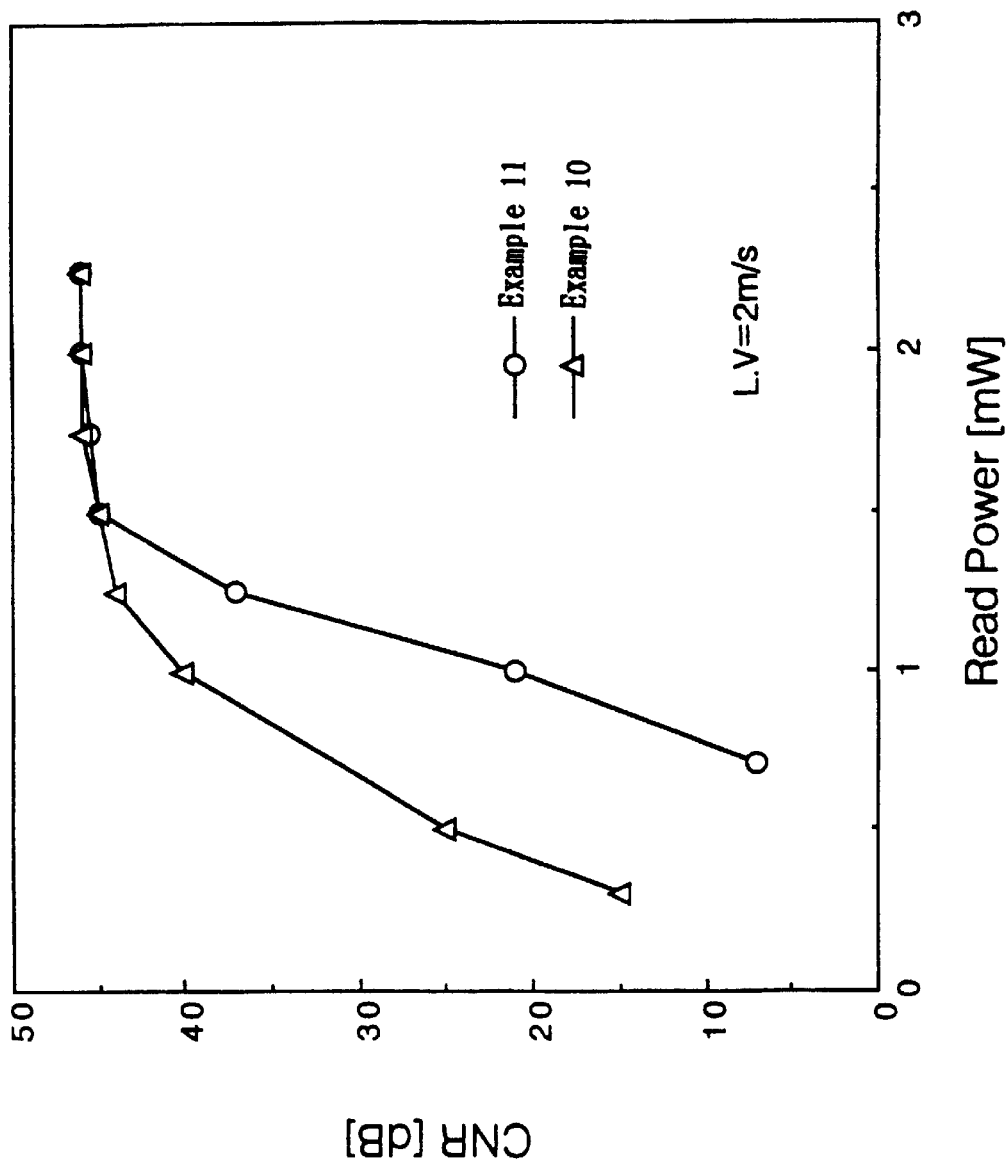
FIG. 43 is a graph illustrating the CNR of the reading signal for the reading laser power according to the tenth and eleventh examples.

FIG. 43 shows a CNR characteristic of the reading signal of the tenth and eleventh examples when the reading laser power is changed. From FIG. 43, it is understood that the CNR of the eleventh example rapidly and steeply changes at around the point when the reading laser power is about 1.5 mW, which is a better characteristic than that of the tenth example. This is presumably an effect of setting the component ratio of Gd of the reading layer 3 to be about 34 at %, which is larger than the component ratio of Gd of the reading layer 3 of the tenth example. Such an effect, that the CNR rapidly and steeply changed at around a certain value of the reading laser power (e.g., about 1.5 mW for the eleventh example), could indeed be sufficiently obtained when the composition of Gd of the reading layer 3 was set to a range of about 30–36 at %.

(6-2-7) Etching Power

Figure 44:
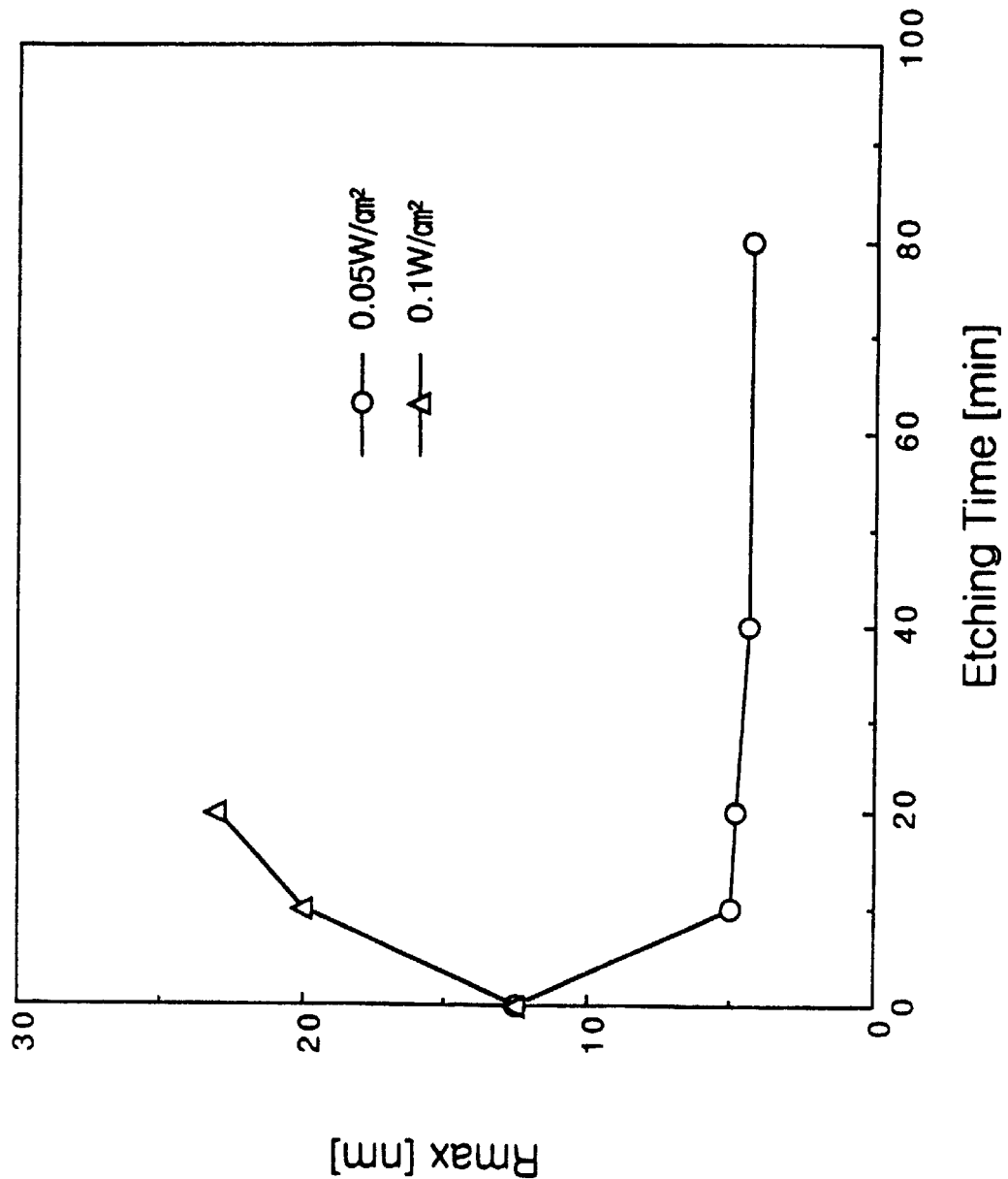
FIG. 44 is a graph for use in comparing the surface smoothness by changing the etching power in the etching processing to the surface of the interference layer.

FIG. 44 is a characteristic diagram comparing the surface smoothness by changing the etching power when etching is applied to the surface of the interference layer 2. From FIG. 44, it is understood that when the etching power intensity is about 0.05 W/cm$^2$, a desired smoothness can be obtained by providing etching for about 10 minutes or more.

When the etching power intensity was set to a range of about 0.02–0.08 W/cm$^2$, a desired smoothness could indeed be obtained.

(6-2-8) Eleventh Example to Twelfth Example

Figure 45:
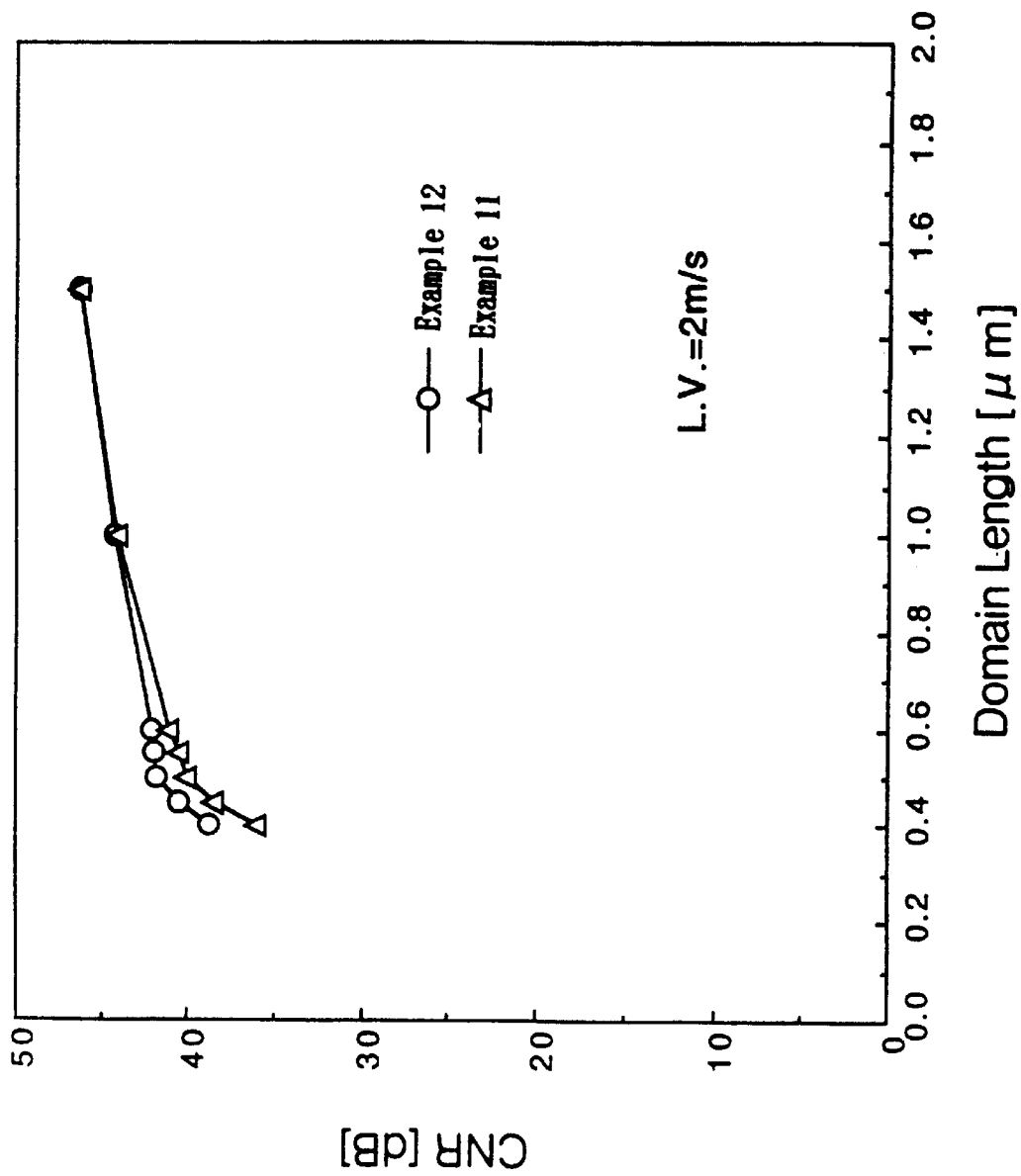
FIG. 45 is a graph illustrating the CNR of the reading signal for domain length according to the eleventh and twelfth examples.

FIG. 45 is a characteristic diagram illustrating the CNR of the reading signal to the recording domain length for the eleventh and twelfth examples. As illustrated in FIG. 45, for the twelfth example, even when the recording domain length was shorter, an acceptable CNR could be obtained. This is presumably because the smoothness of the surface of the interference layer 2 by etching facilitated the movement of the magnetic domain walls, forming more stable domains compared with the eleventh example.

(6-2-9) Thirteenth Example

Figure 46:
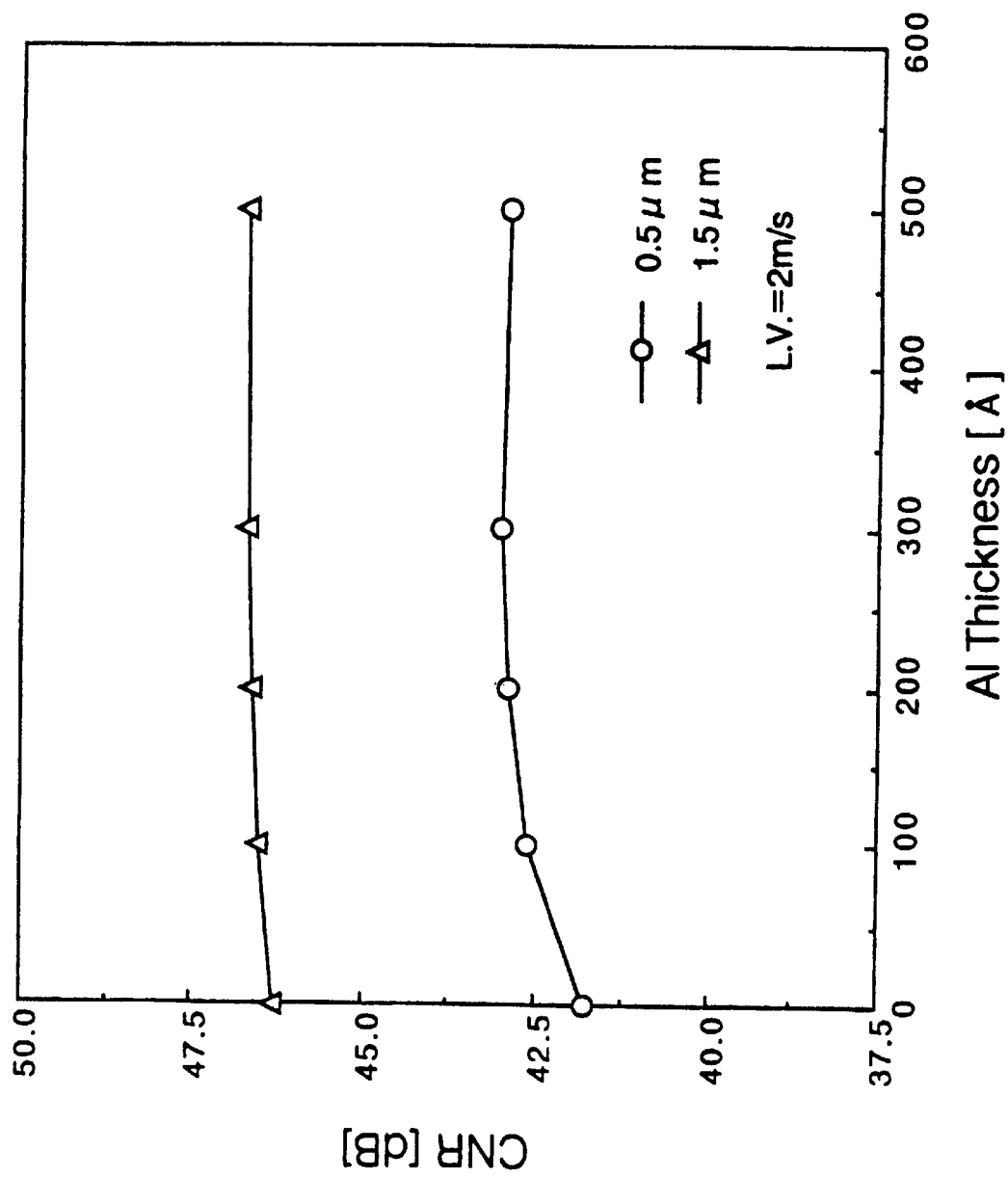
FIG. 46 is a graph illustrating the measurements of the CNR of the reading signal for the thickness of an Al radiation layer when the Al radiation layer is provided on the protection layer of the magneto-optical recording medium according to the twelfth example.

FIG. 46 is a characteristic diagram illustrating the measurements of the CNR of the reading signal to the thickness of an Al radiation layer. Each of the Al radiation layers was provided on the protection layer 5 of the magneto-optical recording medium according to the twelfth example, respectively. Here, the recording domain lengths were set to about 0.5 µm and about 1.5 µm. From FIG. 46, it is understood that when the thickness of the Al radiation layer is set to a range of about 200–500 Å, an acceptable characteristic can be obtained. The radiation layer about 200 Å thick corresponds to the thirteenth example.

(6-2-10) Eleventh Example to Fourteenth Example

Figure 47:
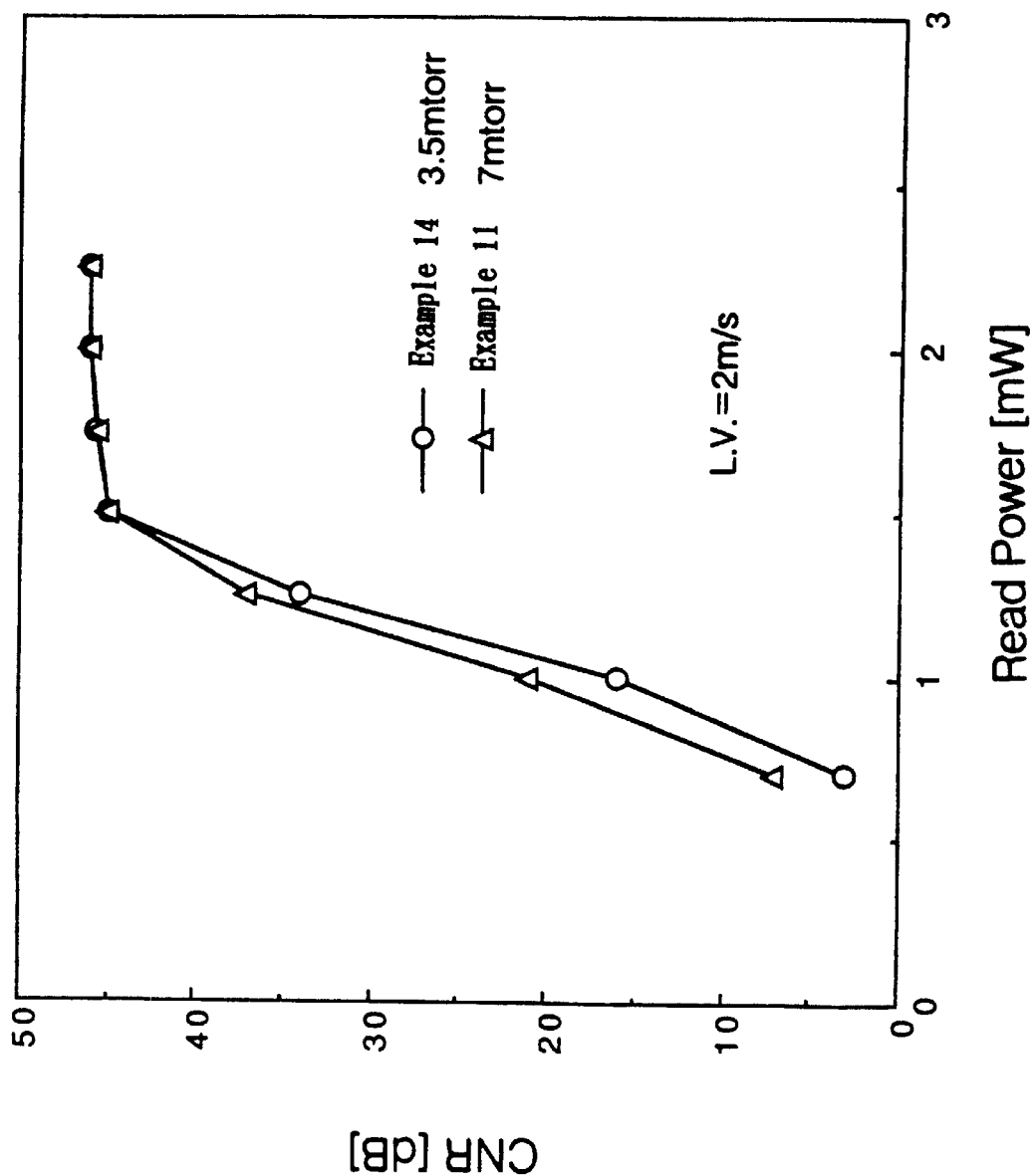
FIG. 47 is a graph illustrating the CNR of the reading signal for the reading laser power according to the eleventh and fourteenth examples.

FIG. 47 shows a CNR characteristic of the reading signal of the eleventh and fourteenth examples when the reading laser power is changed. From FIG. 47, it is understood that in both examples, the CNR of the reading signal rapidly and steeply changes at around the point where the reading laser power is about 1.5 mW and an acceptable characteristic can be obtained. Such acceptable characteristics could indeed be obtained when the sputtering gas pressure for forming the reading layer 3 was set to a range of about 2–7 mTorr.

As described above, the effects of the sixth example can be obtained in the same or better shape even when the surface of the interference layer 2 is smoothed by etching with an etching power intensity within a range of about 0.02–0.08 W/cm$^2$, the thickness of the interference layer 2 is changed within a range of about 600–800 Å, the thickness of the reading layer 3 is changed within a range of about 800–1200 Å, the atomic percent of Co as an ingredient of the recording layer 4 is changed within a range of about 10–16 at %, the atomic percent of Gd as an ingredient of the reading layer 3 is changed within a range of about 30–36 at %, the Al radiation layer is formed on the protection layer 5 within a thickness range of about 200–500 Å, or the sputtering gas pressure for forming the reading layer 3 is changed within a range of about 2–7 mTorr.

(7) Fifteenth Examples

In this example, description will be given to the substrate for the magneto-optical recording medium, recording conditions, and the like, with reference to the appended drawings and tables.

Magneto-optical disks according to preferred embodiments of the present invention have a magnetic layer. The magnetic layer comprises a recording layer and a reading layer. The recording layer is a substantially perpendicular magnetization film and the reading layer is a substantially in-plane magnetization film at about room temperature. The recorded information is read from the magneto-optical disk by irradiating a laser beam with the reading power onto the reading layer. Thus, the temperature of the irradiated area of the reading layer is raised by the laser irradiation, and the direction of the magnetization of the recording layer is copied to the reading layer, and the copied direction of the magnetization of the reading layer is read. This type of disk is called a super-resolution-type magneto-optical recording medium. This magneto-optical recording medium can be recorded and reproduced at a high density.

Figure 17:
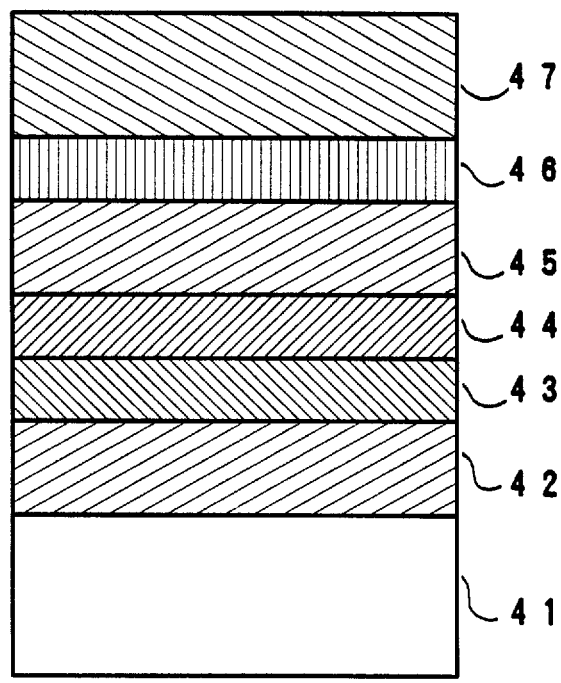
FIG. 17 is a schematic cross-sectional view of a magneto-optical recording medium according to a preferred embodiment of the present invention.

FIG. 17 is a cross-sectional view of a magneto-optical recording medium according to this example. In the construction thereof, an interference layer 42 is formed on a transparent polycarbonate (PC) substrate 41, and a reading layer 43, a recording layer 44, a protection layer 45, a radiation layer 46 and an ultraviolet-setting plastic layer 47 are deposited on the interference layer 42 in this order.

The manufacture of the magneto-optical disk of this example will be described.

Figure 18:
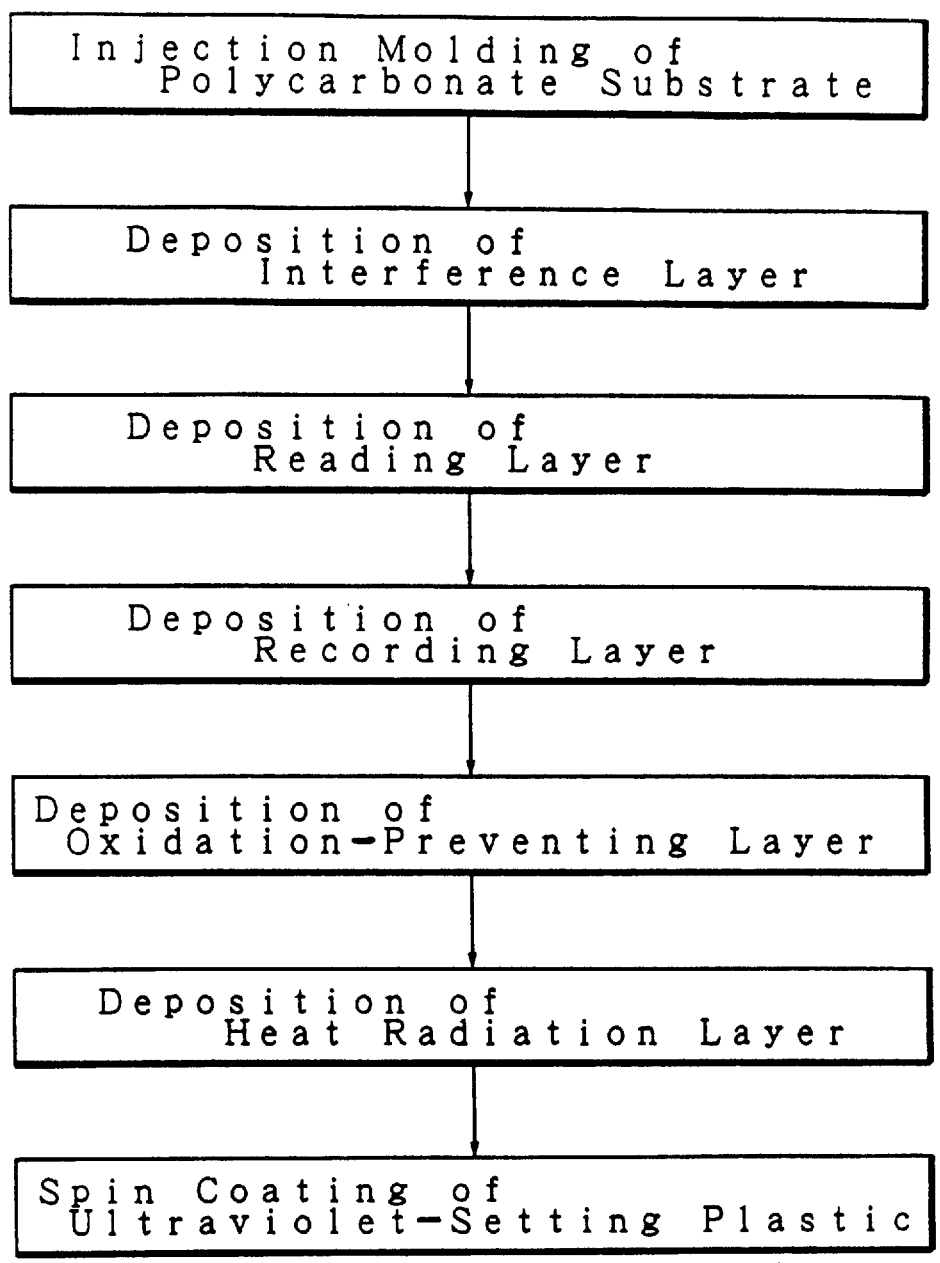
FIG. 18 is a process flow chart of the magneto-optical recording medium according to a preferred embodiment of the present invention.

The manufacturing process for the magneto-optical disk according to a preferred embodiment of the present invention is illustrated in FIG. 18. The transparent polycarbonate (PC) substrate 41 is injection molded, then SiN is deposited on the transparent polycarbonate substrate 41, and then the SIN is etched by using a plasma. Following this, the reading layer 43, the recording layer 44, the protection layer 45, the radiation layer 46 and the ultraviolet-setting plastic layer 47 are deposited one after another as described above.

In this example, instead of the glass substrate conventionally used as a substrate for the super-resolution-type magneto-optical recording medium, polycarbonate (PC) substrate is used. Now, the injection molding of the transparent polycarbonate (PC) substrate will be described.

Figure 19:
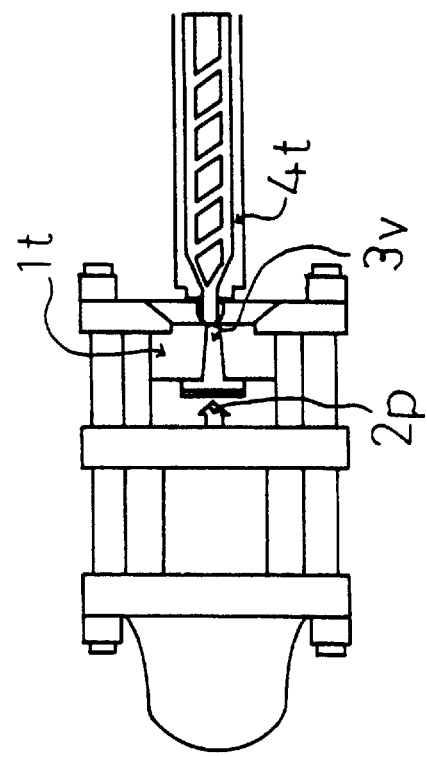
FIG. 19 is a view illustrating an injection molding machine for a transparent polycarbonate substrate of the magneto-optical recording medium according to a preferred embodiment of the present invention.

The injection molding of the transparent polycarbonate (PC) substrate is largely dependent on mold temperature $1t$, mold clamping pressure $2p$, resin injection velocity $3v$, heating cylinder temperature $4t$ and cooling time illustrated in FIG. 19. In this embodiment, the track pitches were set to about 1.4, 1.2, 1.0 and 0.8 µm and the groove to land width ratio was set to about 1:1. The injection molding was performed under the conditions of the fifteenth through eighteenth examples illustrated in FIG. 27, i.e., the molding temperature within a range of about 118°–125° C., the mold clamping "force" within a range of about 180–220 kg/cm$^2$, the resin injection velocity within a range of about 150–200 mm/s, the heating cylinder temperature within a range of about 310°–340° C., and the cooling time within a range of about 9–13 sec.

When the copying ratio of the molded substrate was expressed as a ratio of the depth of the groove of the transparent polycarbonate (PC) substrate to the depth of the groove of the stamper, high copying ratios of about 90% or more could be obtained under all the conditions. The surface conditions of the substrates molded under the respective conditions were measured through an interatomic force microscope (AFM) and the radius of curvature at the corner of the groove and land, and the like was calculated for each example, and the results are shown in FIG. 28.

As a result, the radius of curvature for each track pitch was within a range of about 35–50 nm, the maximum absolute value of the double refraction was within a range of about 20–25 nm, and the variation in the double refraction was within a range of about 8–10 nm, which prove to be acceptable results. The surface roughness of the molded polycarbonate (PC) substrate was within a range of about 10–50 nm, which also proves to be an acceptable result. In particular, for the track pitch of about 1.4 µm, the radius of curvature was about 35 nm and the maximum absolute double refraction was about 22 nm, and the variation in the circumferential direction was about 8 nm, which prove to be acceptable results. Here, the double refraction was measured by using a He-Ne laser beam with a wavelength of about 633 nm with a double path.

Next, as the interference layer 2, SiN film was deposited on the injection molded polycarbonate (PC) substrate to a thickness of about 700 Å by an RF sputtering method under the conditions illustrated in FIG. 34. Then, after the deposition of the SiN film, the surface of the SiN film was smoothed by plasma etching, and then $Gd_xFe_{100-(x+y)}Co_y$ was deposited to a thickness of about 1000 Å as the reading layer 43, $Tb_xFe_{100-(x+y)}Co_y$ was deposited to a thickness of about 500 Å as the recording layer 44, SiN was deposited to a thickness of about 800 Å as the protection layer 45, Al was deposited to a thickness of about 500 Å as the radiation layer 46, and the ultraviolet-setting plastic was deposited to a thickness of about 10 μm as the protection film 47.

For SiN as the interference layer 42, of all the conditions shown in FIG. 34, the RF power of about 500 W and Ar gas pressure of about 5 mTorr are preferable.

The $Gd_xFe_{100-(x+y)}Co_y$ as the reading layer 43 was deposited by an RF two-element magnetron sputtering method under the conditions shown in FIG. 31. Of all the conditions shown in FIG. 31, the RF power of about 70 W for Gd and about 200 W for FeCo, and Ar gas pressure of about 7 mTorr are preferable. In the composition of the $Gd_xFe_{100-(x+y)}Co_y$, x was within a range of about 25–35 and y was within the range of about 0–40, which is suitable to the magneto-optical recording medium according to embodiments of the present invention. Preferably, however, x should be about 30 and y should be about 40.

The $Tb_xFe_{100-(x+y)}Co_y$ as the recording layer 44 was deposited by an RF magnetron sputtering method under the conditions shown in FIG. 30. Of all the conditions shown in FIG. 30, the RF power of about 500 W and Ar gas pressure of about 5 mTorr are preferable. In the composition of the $Tb_xFe_{100-(x+y)}Co_y$, x was within a range of about 15–35 and y was within the range of about 5–30, which are suitable to the magneto-optical recording medium according to embodiments of the present invention. Preferably, x should be about 22.5 and y should be about 14.5. The SiN as the protection layer 45 was deposited by an RF magnetron sputtering method under the conditions shown in FIG. 34. Of all the conditions shown in FIG. 34, the RF power of about 500 W and Ar gas pressure of about 5 mTorr are preferable.

The Al as the radiation layer 46 was deposited by an RF magnetron sputtering method with an Al alloy, such as Al-Ti, Al-Mn and Al-Nb, as the target under the conditions shown in FIG. 29. Of all the conditions shown in FIG. 29, the RF power of about 800 W and Ar gas pressure of about 5 mTorr are preferable. In this case, the Al deposition rate is about 100 Å/min. The radiation layer 6 of this example should not be limited to Al but Au, Pt, Ti, V, Cr, Mn, Fe, Co, Ni, Cu, Zn, Mo, Ag, Sn, Sb and W may also be used. Furthermore, these elements may be used alone or in the form of an alloy in any combination.

On the protection layer 45, the ultraviolet-setting plastic film 47 is formed by an ordinary method, for example, by spin coating.

Now, the recording and reading of the magneto-optical recording medium manufactured as described above will also be described.

Figure 20:
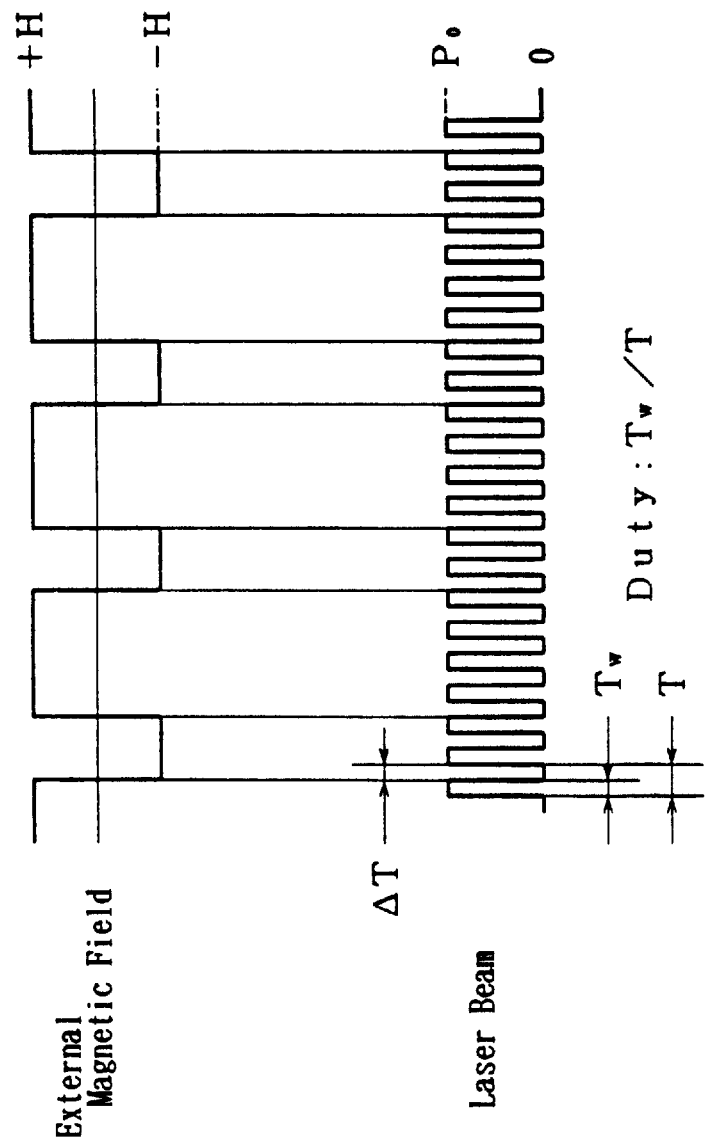
FIG. 20 is a chart illustrating the relations between the modulated external magnetic field and a pulsed laser in the magneto-optical recording medium according to a preferred embodiment of the present invention.
Figure 21:
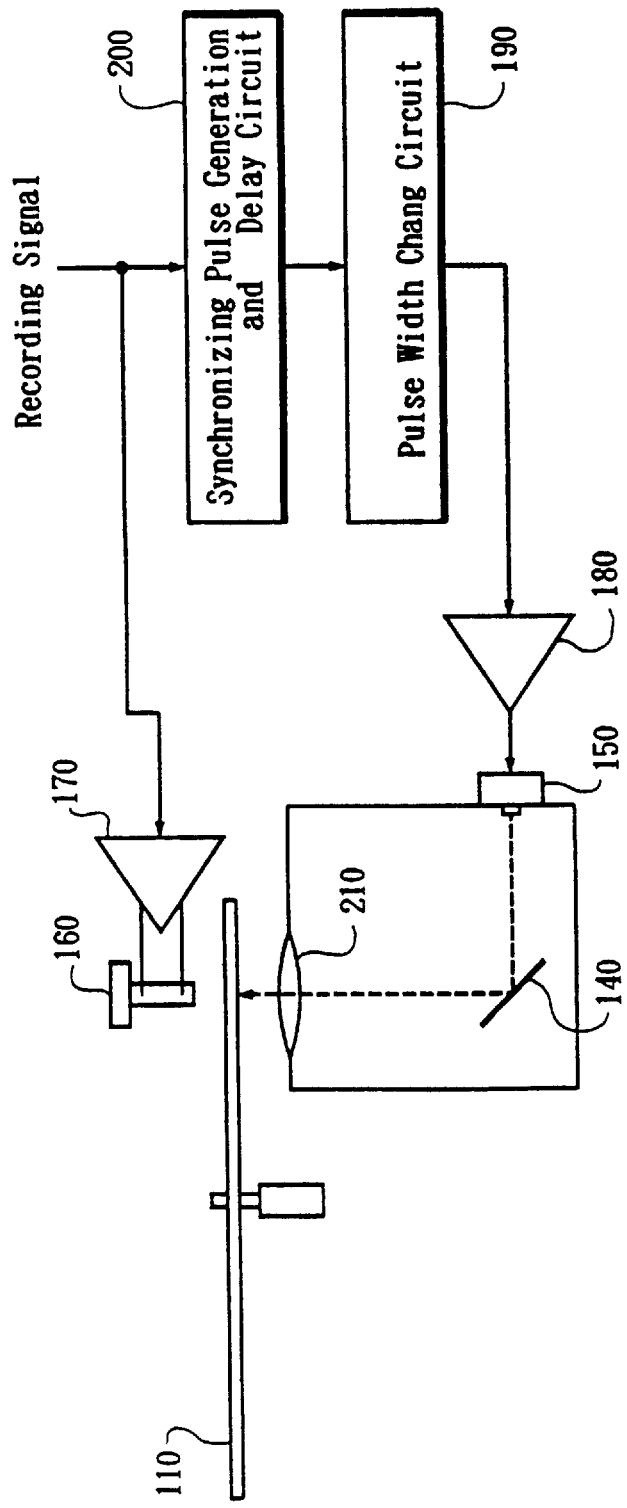
FIG. 21 is a block diagram illustrating a recording circuit for magneto-optical recording medium according to a preferred embodiment of the present invention.

Instead of the conventional recording system using an irradiation with a laser beam of a constant intensity, as illustrated in FIG. 20, the pulse modulation method, using pulsed laser beams, as illustrated in FIG. 20, was employed. FIG. 21 is a block diagram illustrating an exemplary recording apparatus.

The recording signal is input to a synchronizing pulse generation and phase delay circuit 200, and is converted into a pulse signal with a duty ratio or duty cycle of about 50% for synchronization with the recording signal, and then converted into a pulse signal with a phase delayed by about 0–60 ns. This pulse signal is input to a pulse width change circuit 190, and is converted into a pulse signal with a duty ratio of about 20–60%, and then is input to a laser diode driver 180. The laser diode driver 180 turns a laser diode 150 ON and OFF responsive to the pulse signal changed to have a predetermined duty ratio, and thereby the pulse laser beam is irradiated onto the magneto-optical recording medium 110 reflected from a mirror 140 and through an objective lens 210.

The recording signal is input to a magnetic head driver 170. The magnetic head driver 170 drives the magnetic head 160 responsive to the recording signal, and thereby the recording signal is recorded into the magneto-optical recording medium.

Figure 22:
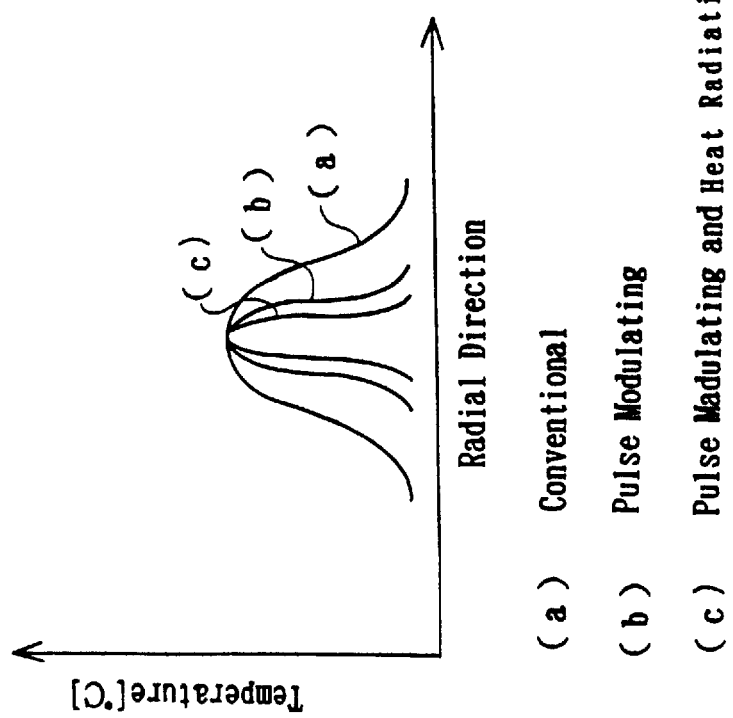
FIG. 22 is a graph qualitatively illustrating the effect of forming the radiation layer according to embodiments of the present invention and utilizing a pulsed laser according to embodiments of the present invention.

In this embodiment, the laser beam is pulse modulated as described above, and, accordingly, the relations between the external magnetic field corresponding to the recording signal and the pulsed laser beam are such that a recording signal is recorded while the laser beam is turned ON about half the time, as illustrated in FIG. 20. Therefore, as is qualitatively illustrated in FIG. 22, compared with the conventional method in which the recording is performed while the laser beam is irradiated with a constant intensity, the red-hot area of the recording layer is narrower when recording is performed with a pulsed laser beam. In FIG. 22, conventional recording is shown as (a) and recording according to an embodiment of the present invention is shown as (b). The red-hot area means an area where the temperature is raised to the proper level for recording. In addition to pulse modulating the laser beam, this effect can also be obtained by depositing Al as the radiation layer on the recording layer. Furthermore, by forming the radiation layer and pulse modulating the laser beam, the effect described above becomes even more evident, and the red-hot area becomes even narrower. This case is shown as (c) in FIG. 22.

In this embodiment the recording into the magneto-optical recording medium was performed under the conditions shown in FIG. 32. The laser wavelength was about 680 nm, the numerical aperture of the objective lens was about 0.55, the recording linear velocity was about 2.0 m/sec, and the recording frequency was about 2.0 MHz, which were all fixed. The external magnetic field, the recording power and optical pulse duty ratio are preferably, of all the conditions shown in FIG. 32, about ±200 Oe, 6 mW and 40%, respectively.

Figure 25:
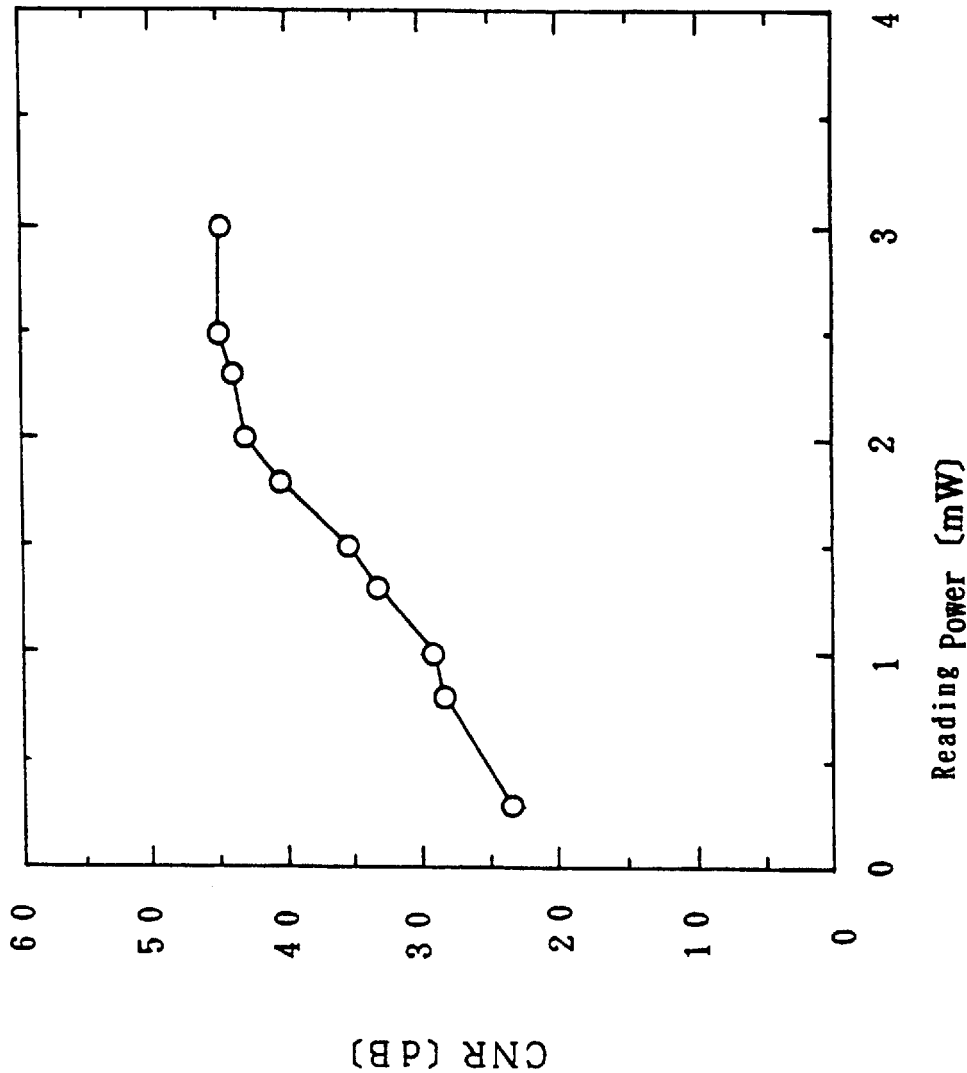
FIG. 25 is a graph illustrating the relations between the CNR and the reading power when the magneto-optical recording medium according to the examples of the present invention is reading.

The reading of the magneto-optical recording medium that had been subjected to high-density recording, with a domain length of about 0.5 μm, by forming the radiation layer and pulse modulating the laser beam, was performed under the conditions shown in FIG. 33. The laser wavelength was about 680 nm, the numerical aperture of the object lens 210 was about 0.55, and the reading linear velocity was about 2.0(±0.1) m/sec, which were all fixed. The reading power of about 2.0 mW or more is preferable of all the conditions shown in FIG. 33. The reading power of about 2.0 mW or more was selected as a reading power that enabled a high CNR in the relations between the reading power shown in FIG. 25 and the CNR in the reading. Thus, according to FIG. 25, the CNR rises as the reading power rises, and an almost constant CNR of about 42–44 dB can be obtained when the reading power is about 2.0 mW or more. Based on this, the laser power of about 2.0 mW or more was selected as a reading power that enabled a high CNR. Furthermore, at different reading linear velocities, acceptable reading powers were selected in the same way. As a result, it was found that the reading power within a range of about 1.5–2.2 mW is suitable to the reading linear velocity within a range of about 1.1–1.3 m/sec, the reading power within a range of about 1.8–2.7 mW is suitable to the reading linear velocity within a range of about 1.5–1.7 m/sec, the reading power within a range of about 2.4–3.7 mW is suitable to the reading linear velocity within a range of about 2.9–3.1 m/sec, the reading power within a range of about 3.2–4.5 mW is suitable to the reading linear velocity within a range of about 4.9–5.1 m/sec, and the reading power within a range of about 4.0–6.0 mW is suitable to the reading linear velocity within a range of about 8.9–9.1 m/sec.

These recording conditions are also suitable to the magneto-optical recording media of the first through fourteenth examples.

Figure 23:
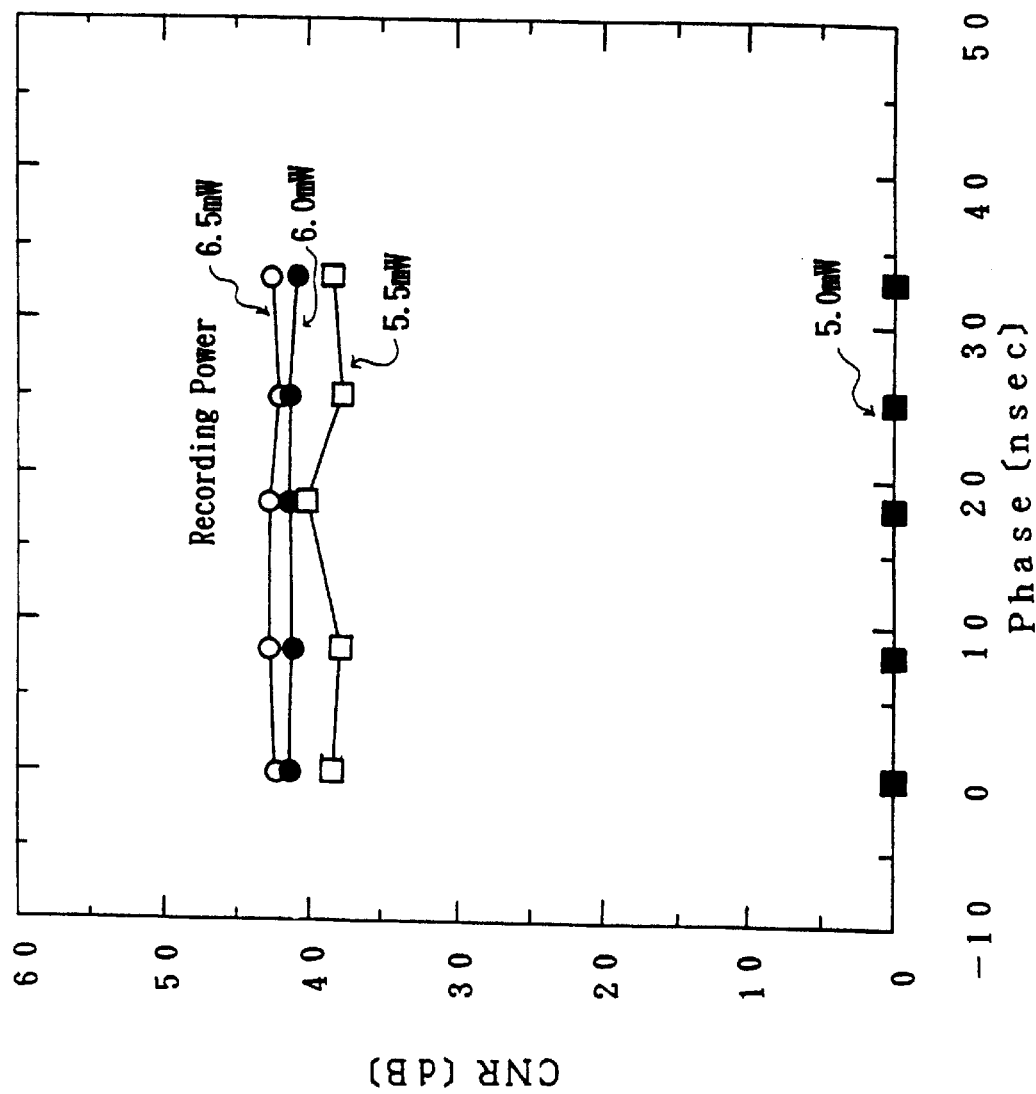
FIG. 23 is a graph illustrating the relations between the phase difference (between a pulsed magnetic field and a pulsed laser) when the magneto-optical recording medium according to the examples of the present invention is recording and the CNR when the same is reading.
Figure 24:
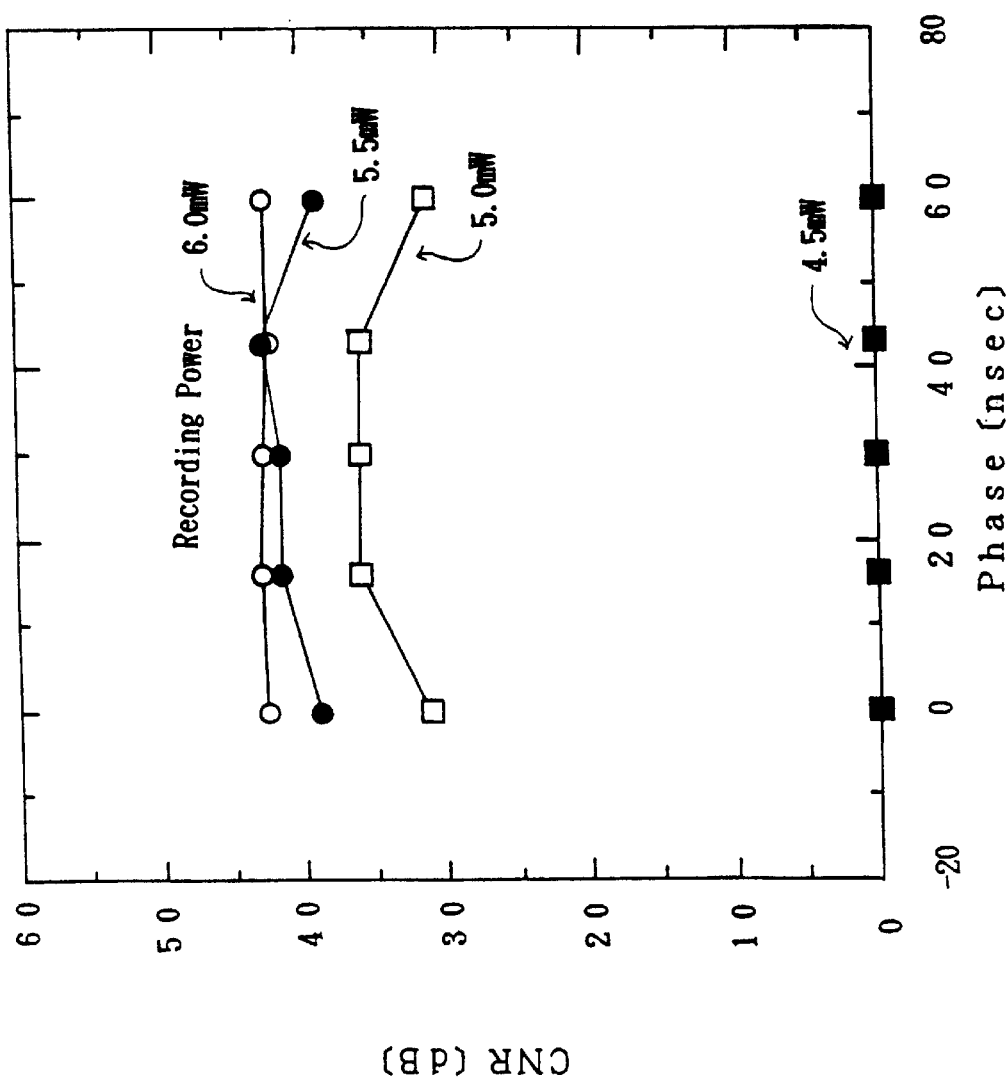
FIG. 24 is a graph illustrating the relations between the phase difference (between a pulsed magnetic field and a pulsed laser) when the magneto-optical recording medium according to the examples of the present invention is recording and the CNR when the same is reading.

FIGS. 23 and 24 illustrate the reading characteristics of the magneto-optical recording medium for high-density recording. FIG. 23 illustrates the relations between the phase difference (phase difference between the pulse magnetic field and pulse modulated laser beam) in recording and the CNR in reading when the laser wavelength is about 680 nm, the numerical aperture of the objective lens 210 is about 0.55, the pulse width of the pulse magnetic field is about 500 nsec, and the number of pulses of the pulse modulated laser beam is 4. As a parameter, the laser power was changed from about 5.0 to about 5.5, to about 6.0 and to about 6.5 mW. With the phase difference within a range of about 0–33 nsec during recording, when the recording laser power increases from about 5.0 mW to about 5.5 mW, the CNR sharply increases from about 0 to about 37–40 dB, and when the recording laser power increases from about 5.5 mW to about 6.5 mW, the CNR slowly increases. When the recording laser power was about 6.5 mW, a CNR of approximately 43 dB was obtained.

FIG. 24 illustrates the relations between the phase difference (phase difference between the pulse magnetic field and pulse modulated laser beam) in recording and the CNR in reading when the laser wavelength is about 680 nm, the numerical aperture of the objective lens 210 is about 0.55, the pulse width of the pulse magnetic field is about 500 nsec, and the number of pulses of the pulse modulated laser beam is 2. As a parameter, the laser power was changed from about 4.5 to about 5.0, to about 5.5 and to about 6.0 mW. With the phase difference within a range of about 0–60 nsec during recording, when the recording laser power increases from about 4.5 mW to about 5.0 mW, the CNR rapidly and steeply increases from about 0 to approximately 35 dB, and when the recording laser power increases from about 5.0 mW to about 6.0 mW, the CNR slowly increases. When the recording laser power was about 6.0 mW, a CNR of approximately 45 dB was obtained.

By comparing FIG. 23 and 24, FIG. 24 shows that, by reducing the number of pulses of the laser beam in recording from 4 to 2, the recording laser power can be reduced from about 5.5 mW to about 5.0 mW, which indicates an acceptable CNR.

Figure 26:
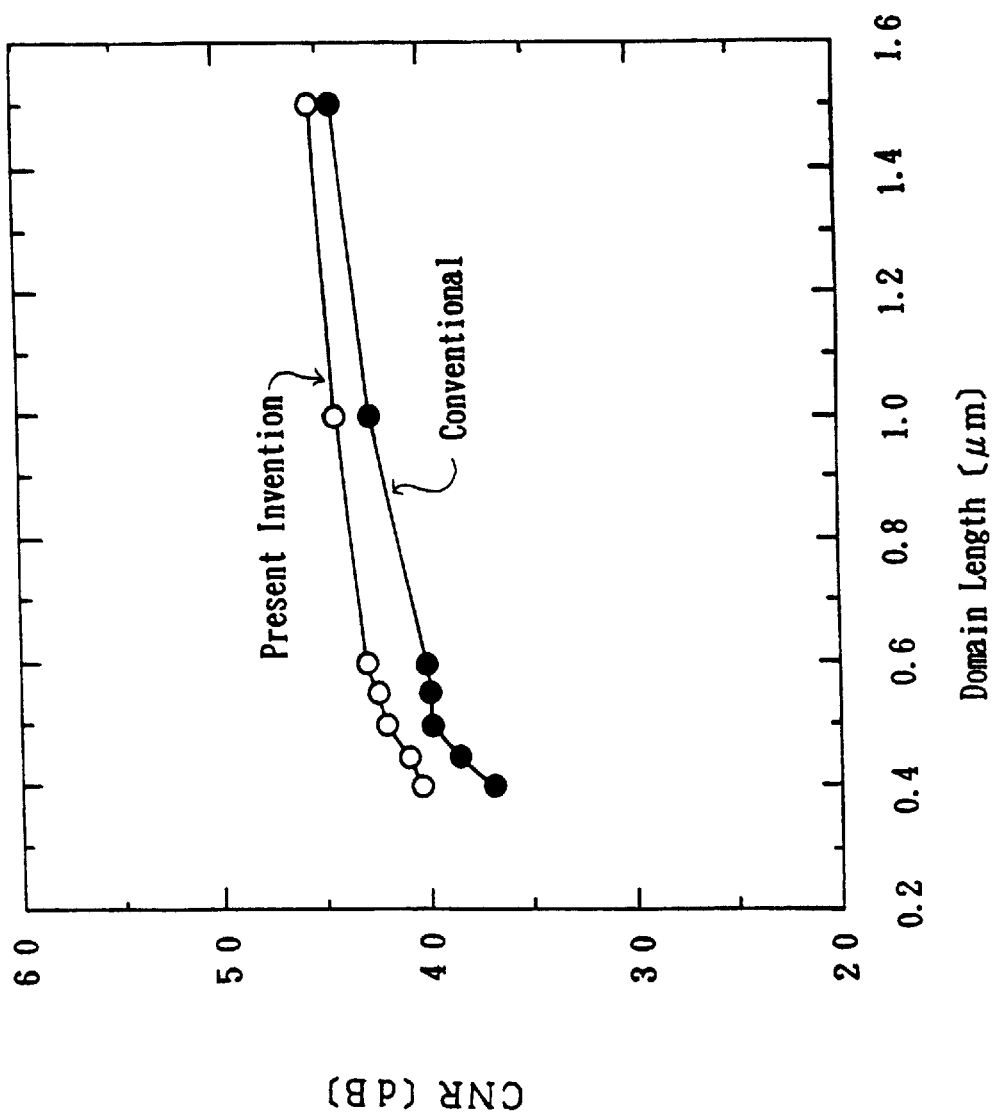
FIG. 26 is a graph illustrating the effect of the radiation layer of the magneto-optical recording medium according to a preferred embodiment of the present invention.

The effect of the radiation layer 46 in reading is evident from the comparison between the prior art and embodiments of the present invention in the relations between the CNR and the domain length illustrated in FIG. 26. Specifically, when the domain length is within a range of about 0.4–1.5 µm, the CNR in reading rises by approximately 1–3 dB. As the improvement in the CNR is more evident when the domain length is shorter, even when the domain length is 0.4 µm or less, similar results can be obtained. Furthermore, for the reading of the magneto-optical recording medium with a short domain length (i.e., a high density), it was found to be effective to form the radiation layer 46 on the recording layer 44.

Moreover, the thickness of Al as the radiation layer 46 should not be limited to about 500 Å, but may be within a range of about 200–1000 Å. This range of film thickness was determined from the relations between the Al thickness and reading resolution shown in FIG. 35, i.e., from the fact that the reading resolution rose as the Al thickness increased and the reading resolution became constant when the Al thickness was about 200 Å or more.

(8) Nineteenth Example

In this example, a description will be given of the recording layer 34 of the magneto-optical recording medium by referring to FIGS. 36 through 39 and FIG. 49.

Figure 36:
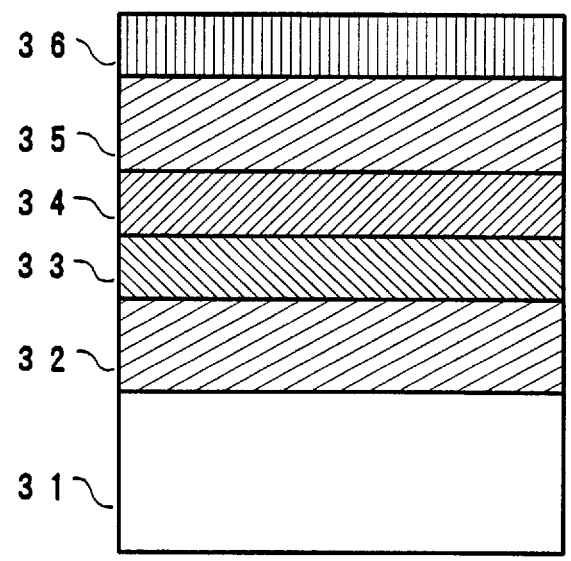
FIG. 36 is a cross-sectional view of a magneto-optical recording medium according to the ninteenth example.

FIG. 36 illustrates a cross-sectional structure of a magneto-optical recording medium of this example. This example was manufactured by using the following procedures. On a polycarbonate (PC) substrate 31 a SiN layer 32 with a thickness of about 800 Å was formed by sputtering as a protection film and also for optical enhancement, like an ordinary magneto-optical disk. Furthermore, on the SiN layer 32 a $Gd_{30}Fe_{55}Co_{15}$ layer 33 with a thickness of about 500 Å and a $(Mn_{80}Cr_{20})_2Sb$ layer 34 with a thickness of about 1000 Å were formed by sputtering. In this sputtering, a complex target composed of Cr and Sb both mounted on a Mn chip was used. Then, SiN was formed on the $(Mn_{80}Cr_{20})_2Sb$ layer 34 to a thickness of about 800 Å as a protection layer 35, and further an ultraviolet-setting plastic 36 with a thickness of about 10 µm was formed by spin coating.

The sputtering conditions for these layers are shown in FIG. 49. Of all the conditions in FIG. 49, it is the most suitable for the formation of the SiN layer 32 when the Ar gas pressure is about 0.4 Pa and the power supply is about 300 W, for the formation of the $Gd_{30}Fe_{55}Co_{15}$ layer 33 when the Ar gas pressure is about 0.67 Pa and the power supply is about 400 W, for the formation of the $(Mn_{80}Cr_{20})_2Sb$ layer 34 when the Ar pressure is about 0.67 Pa and the power supply is about 350 W, and for the formation of the SiN layer 35 when the Ar gas pressure is about 0.4 Pa and the power supply is about 300 W, respectively. The ultraviolet-setting plastic 36 was spin coated only with a dropping quantity of about 5 cc, a spin condition of about 100 rpm and about 2 sec for medium velocity and about 900 rpm and about 3 sec for high velocity, and a exposure time of about 5 sec with a halogen lamp of about 1 kW. The $(Mn_{80}Cr_{20})_2Sb$ layer 34 formed as described above is a magnetic film having a transition from antiferromagnetism to ferromagnetism, and the $Gd_{30}Fe_{55}Co_{15}$ layer 33 formed as described above is a in-plane magnetic film at about room temperature.

Figure 37:
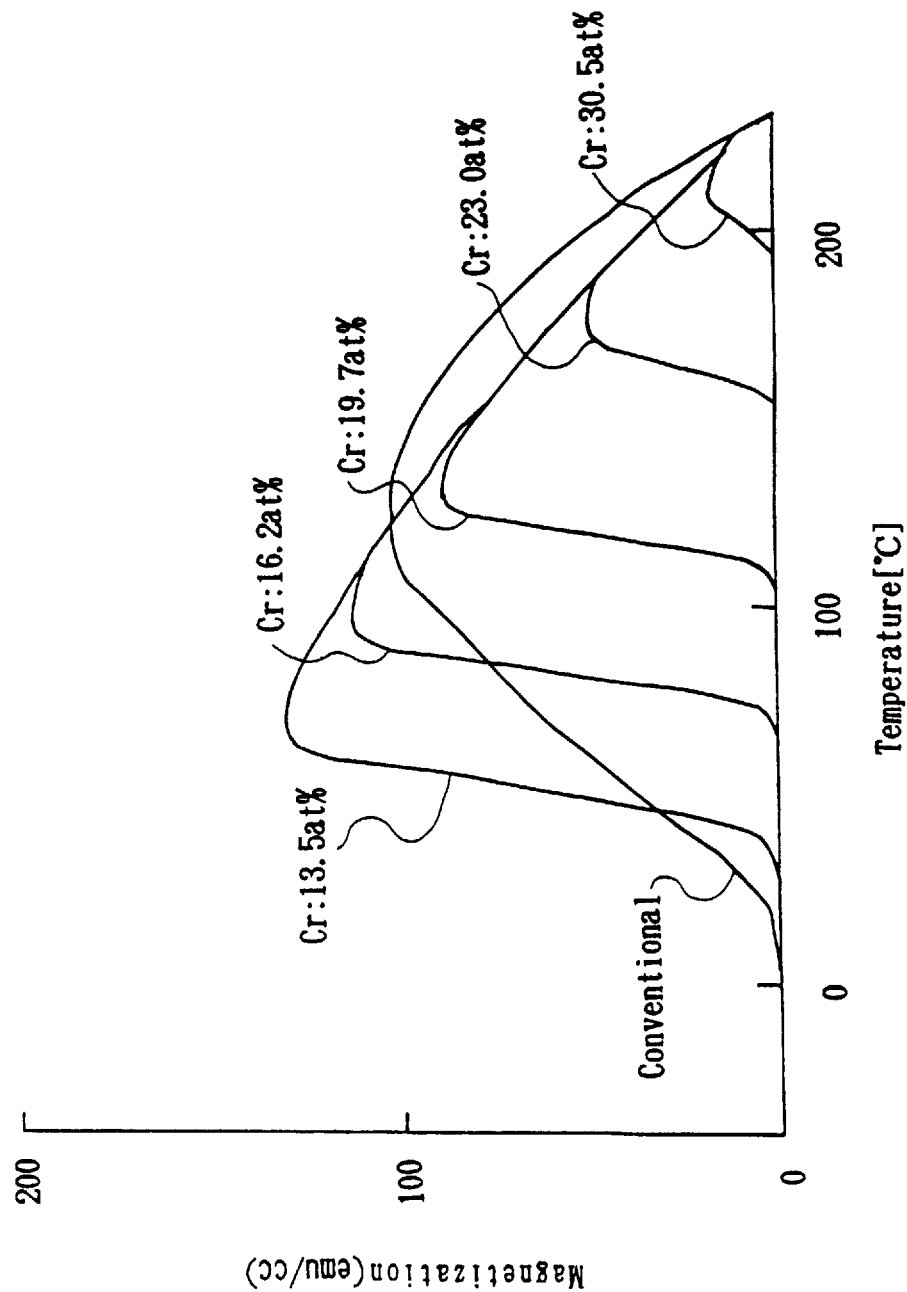
FIG. 37 is a graph illustrating the characteristics of a recording layer according to the nineenth example.

FIG. 37 illustrates the relation between the magnetization of the $(Mn_{80}Cr_{20})_2Sb$ layer 34 and its temperature by using the Cr concentration as a parameter. From FIG. 37, it is understood that by increasing the Cr concentration, the transition point of the $(Mn_{80}Cr_{20})_2Sb$ layer 34 from antiferromagnetism to ferromagnetism shifts to higher temperatures, and, after the transition, the magnetization steeply increases. As the rise of this magnetization is steeper than that of the prior art, the $(Mn_{80}Cr_{20})_2Sb$ layer 34 has a clear copying temperature within a temperature range of about 40°–200° C. and, therefore, is suitable to be a material for the magneto-optical recording medium utilizing MSR technology.

As a result of checking the Curie temperature of the $(Mn_{80}Cr_{20})_2Sb$ layer 34, it was found that the Curie temperature was constantly around about 230° C., and the recording of the information was performed by heating the medium to about 230° C. or more, using a laser beam of about 780 nm in wavelength, and at a track pitch of about 1.6 µm and a recording linear velocity of about 5 m/sec.

Figure 38:
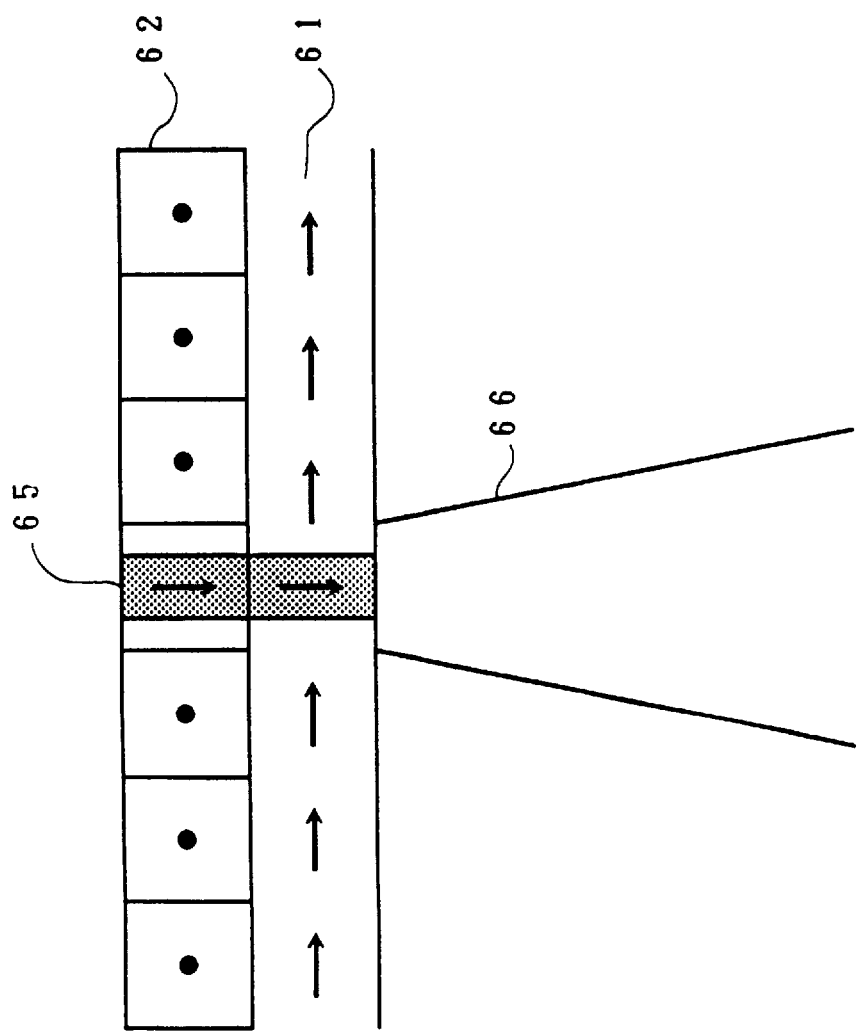
FIG. 38 is a schematic illustrating the ninteenth example reading.

In reading, since the Curie temperature of the $(Mn_{80}Cr_{20})_2Sb$ layer 34 is about 230° C., it is preferable that the temperature should be around about 100° C. In an embodiment of the present invention, the Cr concentration was set to about 20 at %. As illustrated in FIG. 38, when a reading beam 66 is irradiated into the magneto-optical recording medium, a recording layer 62 is heated, the transition from antiferromagnetism to ferromagnetism is caused within the heated area 65, and magnetization occurs. When the magnetization occurs within the recording layer 62, the magnetization is not copied into a reading layer 61, which is an in-plane magnetization film, but the reading layer 61 holds the state of the in-plane magnetization film in this area and functions as a mask. Therefore, the information of only the heated area 65 is reproduced, and the reading in an area smaller than the irradiated beam diameter, i.e., MSR reading, is possible.

It was found that when the reading laser power was about 1.5 mW or more, the reading signal rapidly and steeply appears and MSR reading was enabled. Furthermore, when the reading laser power was about 2.5 mW, the CNR of the domain length of about 0.3 μm was about 40 dB. Accordingly, the information of the recording layer is clearly copied into the reading layer at about 100° C. or more, and there is no magnetic effect of the $(Mn_{80}Cr_{20})_2Sb$ layer 34 on the $Gd_{30}Fe_{55}Co_{15}$ layer 33 within any area other than the reading area. Therefore, the mask effect can further be improved, the reading noise can be reduced, the MSR effect can be increased, and highly uniform MSR reading is thus possible.

Furthermore, according to embodiments of this invention, as illustrated in FIG. 37, when the Cr concentration of $(Mn_{80}Cr_{20})_2Sb$ is within a range of about 10–30 at %, the transition from antiferromagnetism to ferromagnetism is clearly caused. Therefore, by using $(Mn_{80}Cr_{20})_2Sb$ having a Cr concentration within this range as the recording layer, substantially the same MSR reading as that described above can be achieved.

Figure 39:
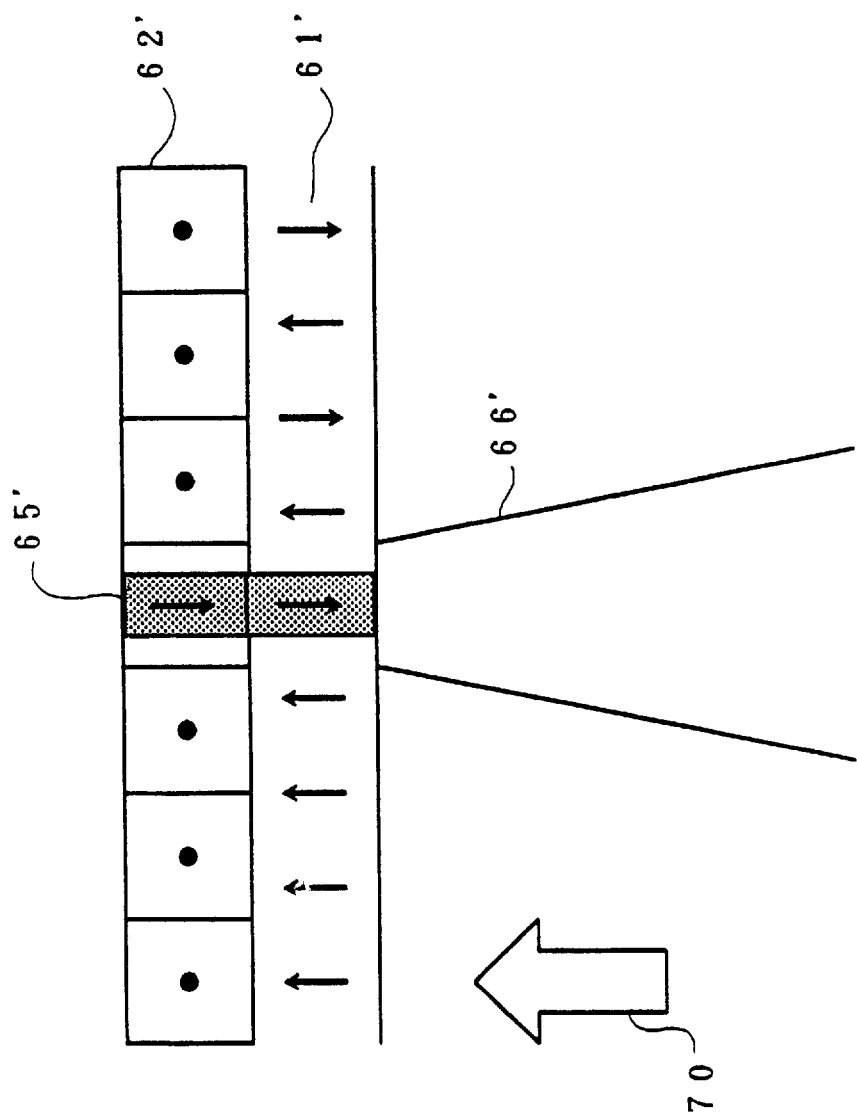
FIG. 39 is a schematic illustrating the ninteenth example reading.

Moreover, in embodiments of the present invention, $Gd_{30}Fe_{55}Co_{15}$, which is an in-plane magnetization film at about room temperature, is used as a reading layer. However, the material should not be limited to $Gd_{30}Fe_{55}Co_{15}$, but any material that can copy the magnetization of the recording layer may be used. For example, if an initialization magnetic field, which aligns the magnetization direction of the reading layer, is used, it is possible to use a perpendicular magnetization film, such as TbFe, GdCo, TbCo and TbFeCo. When such material is used, as illustrated in FIG. 39, an initialization magnetic field 70 is applied and thereby the magnetization of a reading layer 61' is oriented to a recording layer 62', aligning the magnetization of the reading layer 61', and then a laser beam 66' is irradiated into the magneto-optical recording medium for reading.

In a high-temperature area 65', as the magnetization occurs within the recording layer 62', the magnetization oriented to the recording layer 62' reverses the direction to be the same as that of the magnetization of the recording layer 62', and thereby the information of the recording layer 62' is copied into the reading layer 61'. Therefore, it is possible to reproduce the information only within the high-temperature area 65'. In addition, if a perpendicular magnetization film with a coercive force of about 1 kOe or less is used, the magnetic domain to be copied is demagnetized, and the mask is formed also behind the laser beam, and MSR reading is thus possible.

On the other hand, if the recording layer has a primary transition point, the material for the recording layer should not be limited to $(Mn_{80}Cr_{20})_2Sb$, but any magnetic material with $Mn_2Sb$ plus V, Co, Cu, Zn, Ge or As may also be used. The compositions of materials that show advantageous results are $(Mn_{93}V_7)_2Sb$, $(Mn_{75}Co_{25})_2Sb$, $(Mn_{90}Cu_{10})_2Sb$, $(Mn_{90}Zn_{10})_2Sb$, $(Mn_{80}Ge_{10})_2Sb$ and $(Mn_{80}As_{20})_2Sb$.

Figure 48:
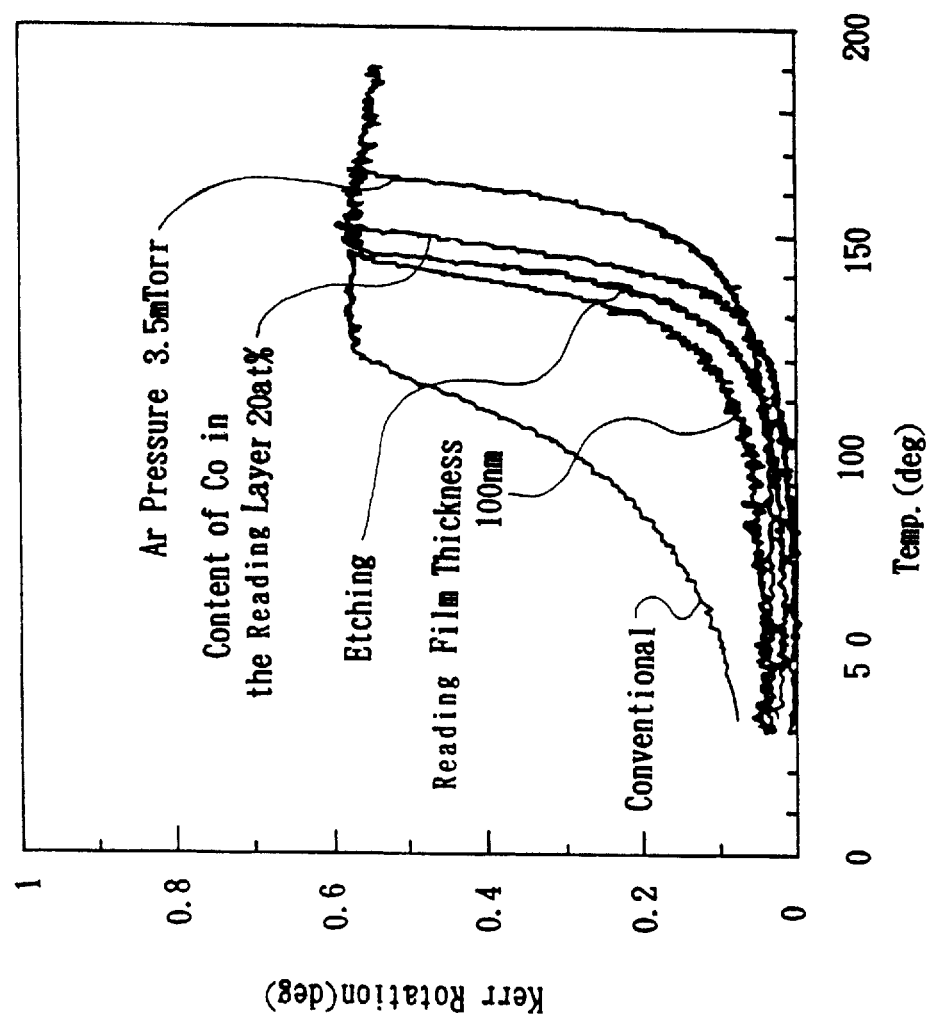
FIG. 48 is a graph illustrating the temperature characteristics of the Kerr rotation angle.

FIG. 48 illustrates the dependence of the Kerr rotation angle on the temperature in the magneto-optical recording media of the examples described above. Each curve in this figure is proportional to $T^c$ (T: temperature). From FIG. 48, 1) by setting the thickness of the reading layer to about 1000 Å;
2) by etching the ground layer;
3) by setting the Co composition of the reading layer to about 20 at %; and
4) by setting the sputtering gas pressure to about 3.5 mTorr, each curve rapidly and steeply rises. The temperature coefficients C of the Kerr rotational angles obtained for the respective curves are about 8.99, 9.69, 10.9 and 11.0, respectively. Therefore, in recording and reading by using these magneto-optical recording media, recording and reading with a density higher than the prior art can be achieved.

We claim:

1. A magneto-optical recording medium comprising:
    a transparent substrate;
    a ground layer formed on the transparent substrate;
    a reading layer including an in-plane magnetization film, having substantially in-plane magnetization at room temperature, formed on the ground layer; and
    a recording layer formed on the reading layer for copying a direction of magnetization into the reading layer by being heated to an inherent copying temperature of said reading layer, wherein a temperature coefficient of a Kerr rotation angle of said reading layer is at least 8.0.

2. The magneto-optical recording medium according to claim 1, wherein the recording layer includes a perpendicular magnetization film having substantially perpendicular magnetization at room temperature.

3. The magneto-optical recording medium according to claim 1, wherein the reading layer includes transition metals including Co and a rare-earth element and an atomic percent of Co in the reading layer is within a range of 12–50 at %.

4. The magneto-optical recording medium according to claim 2, wherein the reading layer includes transition metals including Co and a rare-earth element and an atomic percent of Co in the reading layer is within a range of 12–50 at %.

5. The magneto-optical recording medium according to claim 3, wherein the reading layer includes Gd and Fe.

6. The magneto-optical recording medium according to claim 4, wherein the reading layer includes Gd and Fe.

7. The magneto-optical recording medium according to claim 3, wherein the ground layer is formed by depositing SiN as an interference layer having a thickness within a range of 600–800 Å.

8. The magneto-optical recording medium according to claim 4, wherein the ground layer is formed by depositing SiN as an interference layer having a thickness within a range of 600–800 Å.

9. The magneto-optical recording medium according to claim 5, wherein the ground layer is formed by depositing SiN as an interference layer having a thickness within a range of 600–800 Å.

10. The magneto-optical recording medium according to claim 6, wherein the ground layer is formed by depositing SiN as an interference layer having a thickness within a range of 600–800 Å.

11. The magneto-optical recording medium according to claim 7, wherein a thickness of the reading layer is within a range of 800–1200 Å.

12. The magneto-optical recording medium according to claim 8, wherein a thickness of the reading layer is within a range of 800–1200 Å.

13. The magneto-optical recording medium according to claim 9, wherein a thickness of the reading layer is within a range of 800–1200 Å.

14. The magneto-optical recording medium according to claim 10, wherein a thickness of the reading layer is within a range of 800–1200 Å.

15. The magneto-optical recording medium according to claim 3, wherein the recording layer is formed by depositing TbFeCo having a Co atomic percent within a range of 10–16 at %.

16. The magneto-optical recording medium according to claim 4, wherein the recording layer is formed by depositing TbFeCo having a Co atomic percent within a range of 10–16 at %.

17. The magneto-optical recording medium according to claim 5, wherein the recording layer is formed by depositing TbFeCo having a Co atomic percent within a range of 10–16 at %.

18. The magneto-optical recording medium according to claim 6, wherein the recording layer is formed by depositing TbFeCo having a Co atomic percent within a range of 10–16 at %.

19. The magneto-optical recording medium according to claim 7, wherein the recording layer is formed by depositing TbFeCo having a Co atomic percent within a range of 10–16 at %.

20. The magneto-optical recording medium according to claim 8, wherein the recording layer is formed by depositing TbFeCo having a Co atomic percent within a range of 10–16 at %.

21. The magneto-optical recording medium according to claim 9, wherein the recording layer is formed by depositing TbFeCo having a Co atomic percent within a range of 10–16 at %.

22. The magneto-optical recording medium according to claim 10, wherein the recording layer is formed by depositing TbFeCo having a Co atomic percent within a range of 10–16 at %.

23. The magneto-optical recording medium according to claim 11, wherein the recording layer is formed by depositing TbFeCo having a Co atomic percent within a range of 10–16 at %.

24. The magneto-optical recording medium according to claim 12, wherein the recording layer is formed by depositing TbFeCo having a Co atomic percent within a range of 10–16 at %.

25. The magneto-optical recording medium according to claim 13, wherein the recording layer is formed by depositing TbFeCo having a Co atomic percent within a range of 10–16 at %.

26. The magneto-optical recording medium according to claim 14, wherein the recording layer is formed by depositing TbFeCo having a Co atomic percent within a range of 10–16 at %.

27. The magneto-optical recording medium according to claim 3, wherein the reading layer is formed by depositing GdFeCo having a Gd atomic percent within a range of 30–36 at %.

28. The magneto-optical recording medium according to claim 4, wherein the reading layer is formed by depositing GdFeCo having a Gd atomic percent within a range of 30–36 at %.

29. The magneto-optical recording medium according to claim 5, wherein the reading layer is formed by depositing GdFeCo having a Gd atomic percent within a range of 30–36 at %.

30. The magneto-optical recording medium according to claim 6, wherein the reading layer is formed by depositing GdFeCo having a Gd atomic percent within a range of 30–36 at %.

31. The magneto-optical recording medium according to claim 7, wherein the reading layer is formed by depositing GdFeCo having a Gd atomic percent within a range of 30–36 at %.

32. The magneto-optical recording medium according to claim 8, wherein the reading layer is formed by depositing GdFeCo having a Gd atomic percent within a range of 30–36 at %.

33. The magneto-optical recording medium according to claim 9, wherein the reading layer is formed by depositing GdFeCo having a Gd atomic percent within a range of 30–36 at %.

34. The magneto-optical recording medium according to claim 10, wherein the reading layer is formed by depositing GdFeCo having a Gd atomic percent within a range of 30–36 at %.

35. The magneto-optical recording medium according to claim 11, wherein the reading layer is formed by depositing GdFeCo having a Gd atomic percent within a range of 30–36 at %.

36. The magneto-optical recording medium according to claim 12, wherein the reading layer is formed by depositing GdFeCo having a Gd atomic percent within a range of 30–36 at %.

37. The magneto-optical recording medium according to claim 13, wherein the reading layer is formed by depositing GdFeCo having a Gd atomic percent within a range of 30–36 at %.

38. The magneto-optical recording medium according to claim 14, wherein the reading layer is formed by depositing GdFeCo having a Gd atomic percent within a range of 30–36 at %.

39. The magneto-optical recording medium according to claim 15, wherein the reading layer is formed by depositing GdFeCo having a Gd atomic percent within a range of 30–36 at %.

40. The magneto-optical recording medium according to claim 16, wherein the reading layer is formed by depositing GdFeCo having a Gd atomic percent within a range of 30–36 at %.

41. The magneto-optical recording medium according to claim 17, wherein the reading layer is formed by depositing GdFeCo having a Gd atomic percent within a range of 30–36 at %.

42. The magneto-optical recording medium according to claim 18, wherein the reading layer is formed by depositing GdFeCo having a Gd atomic percent within a range of 30–36 at %.

43. The magneto-optical recording medium according to claim 19, wherein the reading layer is formed by depositing GdFeCo having a Gd atomic percent within a range of 30–36 at %.

44. The magneto-optical recording medium according to claim 20, wherein the reading layer is formed by depositing GdFeCo having a Gd atomic percent within a range of 30–36 at %.

45. The magneto-optical recording medium according to claim 21, wherein the reading layer is formed by depositing GdFeCo having a Gd atomic percent within a range of 30–36 at %.

46. The magneto-optical recording medium according to claim 22, wherein the reading layer is formed by depositing GdFeCo having a Gd atomic percent within a range of 30–36 at %.

47. The magneto-optical recording medium according to claim 23, wherein the reading layer is formed by depositing GdFeCo having a Gd atomic percent within a range of 30–36 at %.

48. The magneto-optical recording medium according to claim 24, wherein the reading layer is formed by depositing GdFeCo having a Gd atomic percent within a range of 30–36 at %.

49. The magneto-optical recording medium according to claim 25, wherein the reading layer is formed by depositing GdFeCo having a Gd atomic percent within a range of 30–36 at %.

50. The magneto-optical recording medium according to claim 26, wherein the reading layer is formed by depositing GdFeCo having a Gd atomic percent within a range of 30–36 at %.

51. The magneto-optical recording medium according to claim 7, wherein the reading layer is formed after a surface of the interference layer is etched by an etching power intensity within a range of 0.02–0.08 $W/cm^2$.

52. The magneto-optical recording medium according to claim 8, wherein the reading layer is formed after a surface of the interference layer is etched by an etching power intensity within a range of 0.02–0.08 $W/cm^2$.

53. The magneto-optical recording medium according to claim 9, wherein the reading layer is formed after a surface of the interference layer is etched by an etching power intensity within a range of 0.02–0.08$W/cm^2$.

54. The magneto-optical recording medium according to claim 10, wherein the reading layer is formed after a surface of the interference layer is etched by an etching power intensity within a range of 0.02–0.08 $W/cm^2$.

55. The magneto-optical recording medium according to claim 11, wherein the reading layer is formed after a surface of the interference layer is etched by an etching power intensity within a range of 0.02–0.08 $W/cm^2$.

56. The magneto-optical recording medium according to claim 12, wherein the reading layer is formed after a surface of the interference layer is etched by an etching power intensity within a range of 0.02–0.08 $W/cm^2$.

57. The magneto-optical recording medium according to claim 13, wherein the reading layer is formed after a surface of the interference layer is etched by an etching power intensity within a range of 0.02–0.08 $W/cm^2$.

58. The magneto-optical recording medium according to claim 14, wherein the reading layer is formed after a surface of the interference layer is etched by an etching power intensity within a range of 0.02–0.08 $W/cm^2$.

59. The magneto-optical recording medium according to claim 15, wherein the reading layer is formed after a surface of the interference layer is etched by an etching power intensity within a range of 0.02–0.08 $W/cm^2$.

60. The magneto-optical recording medium according to claim 16, wherein the reading layer is formed after a surface of the interference layer is etched by an etching power intensity within a range of 0.02–0.08 $W/cm^2$.

61. The magneto-optical recording medium according to claim 17, wherein the reading layer is formed after a surface of the interference layer is etched by an etching power intensity within a range of 0.02–0.08 $W/cm^2$.

62. The magneto-optical recording medium according to claim 18, wherein the reading layer is formed after a surface of the interference layer is etched by an etching power intensity within a range of 0.02–0.08 $W/cm^2$.

63. The magneto-optical recording medium according to claim 19, wherein the reading layer is formed after a surface of the interference layer is etched by an etching power intensity within a range of 0.02–0.08 $W/cm^2$.

64. The magneto-optical recording medium according to claim 20, wherein the reading layer is formed after a surface of the interference layer is etched by an etching power intensity within a range of 0.02–0.08 $W/cm^2$.

65. The magneto-optical recording medium according to claim 21, wherein the reading layer is formed after a surface of the interference layer is etched by an etching power intensity within a range of 0.02–0.08 $W/cm^2$.

66. The magneto-optical recording medium according to claim 22, wherein the reading layer is formed after a surface of the interference layer is etched by an etching power intensity within a range of 0.02–0.08 $W/cm$.

67. The magneto-optical recording medium according to claim 23, wherein the reading layer is formed after a surface of the interference layer is etched by an etching power intensity within a range of 0.02–0.08 $W/cm^2$.

68. The magneto-optical recording medium according to claim 24, wherein the reading layer is formed after a surface of the interference layer is etched by an etching power intensity within a range of 0.02–0.08 $W/cm^2$.

69. The magneto-optical recording medium according to claim 25, wherein the reading layer is formed after a surface of the interference layer is etched by an etching power intensity within a range of 0.02–0.08 $W/cm^2$.

70. The magneto-optical recording medium according to claim 26, wherein the reading layer is formed after a surface of the interference layer is etched by an etching power intensity within a range of 0.02–0.08 $W/cm^2$.

71. The magneto-optical recording medium according to claim 27, wherein the reading layer is formed after a surface of the interference layer is etched by an etching power intensity within a range of 0.02–0.08 $W/cm^2$.

72. The magneto-optical recording medium according to claim 28, wherein the reading layer is formed after a surface of the interference layer is etched by an etching power intensity within a range of 0.02–0.08 $W/cm^2$.

73. The magneto-optical recording medium according to claim 29, wherein the reading layer is formed after a surface of the interference layer is etched by an etching power intensity within a range of 0.02–0.08 $W/cm^2$.

74. The magneto-optical recording medium according to claim 30, wherein the reading layer is formed after a surface of the interference layer is etched by an etching power intensity within a range of 0.02–0.08 $W/cm^2$.

75. The magneto-optical recording medium according to claim 31, wherein the reading layer is formed after a surface of the interference layer is etched by an etching power intensity within a range of 0.02–0.08 $W/cm^2$.

76. The magneto-optical recording medium according to claim 32, wherein the reading layer is formed after a surface of the interference layer is etched by an etching power intensity within a range of 0.02–0.08 $W/cm^2$.

77. The magneto-optical recording medium according to claim 33, wherein the reading layer is formed after a surface of the interference layer is etched by an etching power intensity within a range of 0.02–0.08 $W/cm^2$.

78. The magneto-optical recording medium according to claim 34, wherein the reading layer is formed after a surface of the interference layer is etched by an etching power intensity within a range of 0.02–0.08 $W/cm^2$.

79. The magneto-optical recording medium according to claim 35, wherein the reading layer is formed after a surface of the interference layer is etched by an etching power intensity within a range of 0.02–0.08 $W/cm^2$.

80. The magneto-optical recording medium according to claim 36, wherein the reading layer is formed after a surface of the interference layer is etched by an etching power intensity within a range of 0.02–0.08 $W/cm^2$.

81. The magneto-optical recording medium according to claim 37, wherein the reading layer is formed after a surface of the interference layer is etched by an etching power intensity within a range of 0.02–0.08 $W/cm^2$.

82. The magneto-optical recording medium according to claim 38, wherein the reading layer is formed after a surface of the interference layer is etched by an etching power intensity within a range of 0.02–0.08 W/cm².

83. The magneto-optical recording medium according to claim 39, wherein the reading layer is formed after a surface of the interference layer is etched by an etching power intensity within a range of 0.02–0.08 W/cm².

84. The magneto-optical recording medium according to claim 40, wherein the reading layer is formed after a surface of the interference layer is etched by an etching power intensity within a range of 0.02–0.08 W/cm².

85. The magneto-optical recording medium according to claim 41, wherein the reading layer is formed after a surface of the interference layer is etched by an etching power intensity within a range of 0.02–0.08 W/cm².

86. The magneto-optical recording medium according to claim 42, wherein the reading layer is formed after a surface of the interference layer is etched by an etching power intensity within a range of 0.02–0.08 W/cm².

87. The magneto-optical recording medium according to claim 43, wherein the reading layer is formed after a surface of the interference layer is etched by an etching power intensity within a range of 0.02–0.08 W/cm².

88. The magneto-optical recording medium according to claim 44, wherein the reading layer is formed after a surface of the interference layer is etched by an etching power intensity within a range of 0.02–0.08 W/cm².

89. The magneto-optical recording medium according to claim 45, wherein the reading layer is formed after a surface of the interference layer is etched by an etching power intensity within a range of 0.02–0.08 W/cm².

90. The magneto-optical recording medium according to claim 46, wherein the reading layer is formed after a surface of the interference layer is etched by an etching power intensity within a range of 0.02–0.08 W/cm².

91. The magneto-optical recording medium according to claim 47, wherein the reading layer is formed after a surface of the interference layer is etched by an etching power intensity within a range of 0.02–0.08 W/cm².

92. The magneto-optical recording medium according to claim 48, wherein the reading layer is formed after a surface of the interference layer is etched by an etching power intensity within a range of 0.02–0.08 W/cm².

93. The magneto-optical recording medium according to claim 49, wherein the reading layer is formed after a surface of the interference layer is etched by an etching power intensity within a range of 0.02–0.08 W/cm².

94. The magneto-optical recording medium according to claim 50, wherein the reading layer is formed after a surface of the interference layer is etched by an etching power intensity within a range of 0.02–0.08 W/cm².

95. The magneto-optical recording medium according to claim 27, wherein the reading layer is formed by sputtering within an atmosphere having a sputtering gas pressure within a range of 2–7 mTorr.

96. The magneto-optical recording medium according to claim 28, wherein the reading layer is formed by sputtering within an atmosphere having a sputtering gas pressure within a range of 2–7 mTorr.

97. The magneto-optical recording medium according to claim 29, wherein the reading layer is formed by sputtering within an atmosphere having a sputtering gas pressure within a range of 2–7 mTorr.

98. The magneto-optical recording medium according to claim 30, wherein the reading layer is formed by sputtering within an atmosphere having a sputtering gas pressure within a range of 2–7 mTorr.

99. The magneto-optical recording medium according to claim 31, wherein the reading layer is formed by sputtering within an atmosphere having a sputtering gas pressure within a range of 2–7 mTorr.

100. The magneto-optical recording medium according to claim 32, wherein the reading layer is formed by sputtering within an atmosphere having a sputtering gas pressure within a range of 2–7 mTorr.

101. The magneto-optical recording medium according to claim 33, wherein the reading layer is formed by sputtering within an atmosphere having a sputtering gas pressure within a range of 2–7 mTorr.

102. The magneto-optical recording medium according to claim 34, wherein the reading layer is formed by sputtering within an atmosphere having a sputtering gas pressure within a range of 2–7 mTorr.

103. The magneto-optical recording medium according to claim 35, wherein the reading layer is formed by sputtering within an atmosphere having a sputtering gas pressure within a range of 2–7 mTorr.

104. The magneto-optical recording medium according to claim 36, wherein the reading layer is formed by sputtering within an atmosphere having a sputtering gas pressure within a range of 2–7 mTorr.

105. The magneto-optical recording medium according to claim 37, wherein the reading layer is formed by sputtering within an atmosphere having a sputtering gas pressure within a range of 2–7 mTorr.

106. The magneto-optical recording medium according to claim 38, wherein the reading layer is formed by sputtering within an atmosphere having a sputtering gas pressure within a range of 2–7 mTorr.

107. The magneto-optical recording medium according to claim 39, wherein the reading layer is formed by sputtering within an atmosphere having a sputtering gas pressure within a range of 2–7 mTorr.

108. The magneto-optical recording medium according to claim 40, wherein the reading layer is formed by sputtering within an atmosphere having a sputtering gas pressure within a range of 2–7 mTorr.

109. The magneto-optical recording medium according to claim 41, wherein the reading layer is formed by sputtering within an atmosphere having a sputtering gas pressure within a range of 2–7 mTorr.

110. The magneto-optical recording medium according to claim 42, wherein the reading layer is formed by sputtering within an atmosphere having a sputtering gas pressure within a range of 2–7 mTorr.

111. The magneto-optical recording medium according to claim 43, wherein the reading layer is formed by sputtering within an atmosphere having a sputtering gas pressure within a range of 2–7 mTorr.

112. The magneto-optical recording medium according to claim 44, wherein the reading layer is formed by sputtering within an atmosphere having a sputtering gas pressure within a range of 2–7 mTorr.

113. The magneto-optical recording medium according to claim 45, wherein the reading layer is formed by sputtering within an atmosphere having a sputtering gas pressure within a range of 2–7 mTorr.

114. The magneto-optical recording medium according to claim 46, wherein the reading layer is formed by sputtering within an atmosphere having a sputtering gas pressure within a range of 2–7 mTorr.

115. The magneto-optical recording medium according to claim 47, wherein the reading layer is formed by sputtering within an atmosphere having a sputtering gas pressure within a range of 2–7 mTorr.

116. The magneto-optical recording medium according to claim 48, wherein the reading layer is formed by sputtering within an atmosphere having a sputtering gas pressure within a range of 2–7 mTorr.

117. The magneto-optical recording medium according to claim 49, wherein the reading layer is formed by sputtering within an atmosphere having a sputtering gas pressure within a range of 2–7 mTorr.

118. The magneto-optical recording medium according to claim 50, wherein the reading layer is formed by sputtering within an atmosphere having a sputtering gas pressure within a range of 2–7 mTorr.

119. A magneto-optical recording medium comprising:
a transparent substrate made of polycarbonate;
a ground layer formed on the transparent substrate;
a reading layer including an in-plane magnetization film, having substantially in-plane magnetization at room temperature, formed on the ground layer; and
a recording layer formed on the reading layer for copying a direction of magnetization into the reading layer by being heated to an inherent copying temperature of said reading layer, wherein a temperature coefficient of a Kerr rotation angle of said reading layer is at least 8.0.

120. The magneto-optical recording medium according to claim 119, wherein the recording layer includes a perpendicular magnetization film having substantially perpendicular magnetization at room temperature, the reading layer includes transition metals including Co and a rare-earth element and an atomic percent of Co in the reading layer is within a range of 12–50 at %, and the ground layer is formed by depositing SiN as an interference layer having a thickness within a range of 600–800 Å.

121. The magneto-optical recording medium according to claim 120, wherein a thickness of the reading layer is within a range of 800–1200 Å.

122. The magneto-optical recording medium according to claim 120, wherein the recording layer is formed by depositing TbFeCo having a Co atomic percent within a range of 10–16 at %.

123. The magneto-optical recording medium according to claim 121, wherein the recording layer is formed by depositing TbFeCo having a Co atomic percent within a range of 10–16 at %.

124. The magneto-optical recording medium according to claim 120, wherein the reading layer is formed by depositing GdFeCo having a Gd atomic percent within a range of 30–36 at %.

125. The magneto-optical recording medium according to claim 121, wherein the reading layer is formed by depositing GdFeCo having a Gd atomic percent within a range of 30–36 at %.

126. The magneto-optical recording medium according to claim 122, wherein the reading layer is formed by depositing GdFeCo having a Gd atomic percent within a range of 30–36 at %.

127. The magneto-optical recording medium according to claim 123, wherein the reading layer is formed by depositing GdFeCo having a Gd atomic percent within a range of 30–36 at %.

128. The magneto-optical recording medium according to claim 120, wherein the reading layer is formed after a surface of the interference layer is etched by an etching power intensity within a range of 0.02–0.08 W/cm$^2$.

129. The magneto-optical recording medium according to claim 121, wherein the reading layer is formed after a surface of the interference layer is etched by an etching power intensity within a range of 0.02–0.08 W/cm$^2$.

130. The magneto-optical recording medium according to claim 122, wherein the reading layer is formed after a surface of the interference layer is etched by an etching power intensity within a range of 0.02–0.08 W/cm$^2$.

131. The magneto-optical recording medium according to claim 123, wherein the reading layer is formed after a surface of the interference layer is etched by an etching power intensity within a range of 0.02–0.08 W/cm$^2$.

132. The magneto-optical recording medium according to claim 124, wherein the reading layer is formed after a surface of the interference layer is etched by an etching power intensity within a range of 0.02–0.08 W/cm$^2$.

133. The magneto-optical recording medium according to claim 125, wherein the reading layer is formed after a surface of the interference layer is etched by an etching power intensity within a range of 0.02–0.08 W/cm$^2$.

134. The magneto-optical recording medium according to claim 126, wherein the reading layer is formed after a surface of the interference layer is etched by an etching power intensity within a range of 0.02–0.08 W/cm$^2$.

135. The magneto-optical recording medium according to claim 127, wherein the reading layer is formed after a surface of the interference layer is etched by an etching power intensity within a range of 0.02–0.08 W/cm$^2$.

136. The magneto-optical recording medium according to claim 124, wherein the reading layer is formed by sputtering within an atmosphere having a sputtering gas pressure within a range of 2–7 mTorr.

137. The magneto-optical recording medium according to claim 125, wherein the reading layer is formed by sputtering within an atmosphere having a sputtering gas pressure within a range of 2–7 mTorr.

138. The magneto-optical recording medium according to claim 126, wherein the reading layer is formed by sputtering within an atmosphere having a sputtering gas pressure within a range of 2–7 mTorr.

139. The magneto-optical recording medium according to claim 127, wherein the reading layer is formed by sputtering within an atmosphere having a sputtering gas pressure within a range of 2–7 mTorr.

140. The magneto-optical recording medium according to claim 120, wherein the recording layer includes TbFeCo, and the reading layer includes a material selected from the group consisting of GdFeCo, GdFeCoCr, GdFeCoNi, GdFeCoTi, GdFeCoAl, GdFeCoMn, GdFeCoNiCr, and GdFeCoAlTi.

141. The magneto-optical recording medium according to claim 121, wherein the recording layer includes TbFeCo, and the reading layer includes a material selected from the group consisting of GdFeCo, GdFeCoCr, GdFeCoNi, GdFeCoTi, GdFeCoAl, GdFeCoMn, GdFeCoNiCr, and GdFeCoAlTi.

142. A magneto-optical recording medium comprising:
a transparent substrate made of polycarbonate;
a ground layer formed on the transparent substrate;
a reading layer including an in-plane magnetization film, having substantially in-plane magnetization at room temperature, formed on the ground layer; and
a recording layer formed on the reading layer for copying a direction of magnetization into the reading layer by being heated to an inherent copying temperature of said reading layer; and
a radiation layer formed on the recording layer, wherein a temperature coefficient of a Kerr rotation angle of said reading layer is at least 8.0.

143. The magneto-optical recording medium according to claim 142, wherein the recording layer includes a perpendicular magnetization film having substantially perpendicular magnetization at room temperature, the reading layer includes transition metals including Co and a rare-earth element and an atomic percent of Co in the reading layer is within a range of 12–50 at %, and the ground layer is formed by depositing SiN as an interference layer having a thickness within a range of 600–800 Å.

144. The magneto-optical recording medium according to claim 143, wherein a thickness of the reading layer is within a range of 800–1200 Å.

145. The magneto-optical recording medium according to claim 143, wherein the recording layer is formed by depositing TbFeCo having a Co atomic percent within a range of 10–16 at %.

146. The magneto-optical recording medium according to claim 144, wherein the recording layer is formed by depositing TbFeCo having a Co atomic percent within a range of 10–16 at %.

147. The magneto-optical recording medium according to claim 143, wherein the reading layer is formed by depositing GdFeCo having a Gd atomic percent within a range of 30–36 at %.

148. The magneto-optical recording medium according to claim 144, wherein the reading layer is formed by depositing GdFeCo having a Gd atomic percent within a range of 30–36 at %.

149. The magneto-optical recording medium according to claim 145, wherein the reading layer is formed by depositing GdFeCo having a Gd atomic percent within a range of 30–36 at %.

150. The magneto-optical recording medium according to claim 146, wherein the reading layer is formed by depositing GdFeCo having a Gd atomic percent within a range of 30–36 at %.

151. The magneto-optical recording medium according to claim 143, wherein the recording layer includes TbFeCo, and the reading layer includes a material selected from the group consisting of GdFeCo, GdFeCoCr, GdFeCoNi, GdFeCoTi, GdFeCoAl, GdFeCoMn, GdFeCoNiCr, and GdFeCoAlTi.

152. The magneto-optical recording medium according to claim 142, wherein the radiation layer includes at least one metal selected from the group consisting of Al, Au, Pt, Ti, V, Cr, Mn, Fe, Co, Ni, Cu, Zn, Mo, Ag, Sn, Sb and W.

153. The magneto-optical recording medium according to claim 143, wherein the radiation layer includes at least one metal selected from the group consisting of Al, Au, Pt, Ti, V, Cr, Mn, Fe, Co, Ni, Cu, Zn, Mo, Ag, Sn, Sb and W.

154. The magneto-optical recording medium according to claim 151, wherein the radiation layer includes at least one metal selected from the group consisting of Al, Au, Pt, Ti, V, Cr, Mn, Fe, Co, Ni, Cu, Zn, Mo, Ag, Sn, Sb and W.

155. The magneto-optical recording medium according to claim 142, wherein a thickness of the radiation layer is within a range of 200–1000 Å.

156. The magneto-optical recording medium according to claim 152, wherein a thickness of the radiation layer is within a range of 200–1000 Å.

157. The magneto-optical recording medium according to claim 153, wherein a thickness of the radiation layer is within a range of 200–1000 Å.

158. The magneto-optical recording medium according to claim 154, wherein a thickness of the radiation layer is within a range of 200–1000 Å.

159. The magneto-optical recording medium according to claim 155, wherein the reading layer is formed after a surface of the ground layer is etched by an etching power intensity within a range of 0.02–0.08 W/cm$^2$.

160. The magneto-optical recording medium according to claim 152, wherein the radiation layer is formed by an RF magnetron sputtering method having a power within a range of 100–1000 W and under an Ar gas pressure within a range of 1–10 mTorr.

161. The magneto-optical recording medium according to claim 153, wherein the radiation layer is formed by an RF magnetron sputtering method having a power within a range of 100–1000 W and under an Ar gas pressure within a range of 1–10 mTorr.

162. The magneto-optical recording medium according to claim 154, wherein the radiation layer is formed by an RF magnetron sputtering method having a power within a range of 100–1000 W and under an Ar gas pressure within a range of 1–10 mTorr.

163. The magneto-optical recording medium according to claim 142, wherein the transparent substrate has a double refraction within a range of 20–25 nm, a circumferential variation in the double refraction within a range of 6–10 nm, and a radius of curvature at a corner of a groove and land within a range of 35–50 nm.

164. The magneto-optical recording medium according to claim 142, wherein the transparent substrate has a surface roughness within a range of 100–500 Å.

165. The magneto-optical recording medium according to claim 1, wherein the recording layer includes a magnetic layer having a transition point from antiferromagnetism to ferromagnetism at a temperature of at least 50° C.

166. The magneto-optical recording medium according to claim 165, wherein the recording layer includes $(Mn_{(100-x)}M_x)_2Sb$, where M is a metal selected from the group consisting of Cr, V, Co, Cu, Zn, Ge and As.

167. The magneto-optical recording medium according to claim 166, wherein M is Cr, and atomic percent x is in a range within 10–30 at %.

* * * * *